US012784351B2

(12) United States Patent
Hylak et al.

(10) Patent No.: US 12,784,351 B2
(45) Date of Patent: Nov. 3, 2026

(54) VIRTUAL PRESENTATION REHEARSAL

(71) Applicant: Apple Inc., Cupertino, CA (US)

(72) Inventors: Benjamin Hylak, San Francisco, CA (US); Aaron M. Burns, Sunnyvale, CA (US); Grant H. Mulliken, Los Gatos, CA (US); Mary A. Pyc, Campbell, CA (US); Nathan Gitter, Cupertino, CA (US); Pau Sastre Miguel, San Francisco, CA (US); Steven A. Marchette, Saratoga, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 19/248,840

(22) Filed: Jun. 25, 2025

(65) Prior Publication Data

US 2025/0322606 A1 Oct. 16, 2025

Related U.S. Application Data

(63) Continuation of application No. 18/286,527, filed as application No. PCT/US2022/024248 on Apr. 11, 2022, now Pat. No. 12,374,038.

(60) Provisional application No. 63/174,281, filed on Apr. 13, 2021.

(51) Int. Cl.

| | |
|---|---|
| ***G06T 17/00*** | (2006.01) |
| ***G06V 40/16*** | (2022.01) |
| ***G06V 40/20*** | (2022.01) |
| ***H04N 13/388*** | (2018.01) |

(52) U.S. Cl.

CPC ............ *G06T 17/00* (2013.01); *G06V 40/174* (2022.01); *G06V 40/20* (2022.01); *H04N 13/388* (2018.05)

(58) Field of Classification Search

CPC .... G06T 17/00; H04N 13/388; G06V 40/174; G06V 40/20

See application file for complete search history.

(56) References Cited

U.S. PATENT DOCUMENTS

| | | | |
|---|---|---|---|
| 2012/0276512 | A1 | 11/2012 | Johnston et al. |
| 2015/0132735 | A1 | 5/2015 | Edge |
| 2016/0049094 | A1 | 2/2016 | Gupta et al. |
| 2019/0130788 | A1 | 5/2019 | Seaton |
| 2019/0392730 | A1 | 12/2019 | Gupta et al. |
| 2020/0193853 | A1 | 6/2020 | Ahn et al. |

(Continued)

OTHER PUBLICATIONS

PCT International Search Report and Written Opinion dated Jul. 4, 2022, PCT International Application No. PCT/US2022/024248, pp. 1-12.

(Continued)

*Primary Examiner* — Sardis F Azongha

(74) *Attorney, Agent, or Firm* — Fernando & Partners, LLP

(57) ABSTRACT

In one implementation, a method of assisting in the rehearsal of a presentation is performed at a device including a display, one or more processors, and non-transitory memory. The method includes obtaining a difficulty level for a rehearsal of a presentation based on a difficulty level for a prior rehearsal of the presentation and a rating of the prior rehearsal of the presentation. The method includes displaying, on the display, one or more slides of the presentation. The method includes displaying, on the display in association with a volumetric environment, one or more virtual objects based on the difficulty level.

19 Claims, 20 Drawing Sheets

(56) References Cited

U.S. PATENT DOCUMENTS

| | | | |
|---|---|---|---|
| 2020/0202125 A1 | 6/2020 | Feng et al. | |
| 2020/0380264 A1* | 12/2020 | Poteet | G06V 20/49 |
| 2021/0065582 A1 | 3/2021 | Liao et al. | |
| 2021/0103851 A1 | 4/2021 | Spotanski | |
| 2021/0271864 A1 | 9/2021 | Litvin | |

OTHER PUBLICATIONS

Asadi, "Presentation Tracking Using Confusion Networks, Semantic Matching, and Keyword Weighting," Aug. 2016.
"Virtual Orator," https://web.archive.org/web/20210122134238/https://virtualorator.com/, Jan. 22, 2021.

* cited by examiner

VIRTUAL PRESENTATION REHEARSAL

CROSS-REFERENCE TO RELATED APPLICATIONS

This application is a continuation of U.S. patent application Ser. No. 18/286,527, filed on Oct. 11, 2023, which is the national stage entry of Intl. Patent App. No. PCT/US2022/024248, filed on Apr. 11, 2022, which claims priority to U.S. Provisional Patent App. No. 63/174,281, filed on Apr. 13, 2021, which are all hereby incorporated by reference in their entirety.

TECHNICAL FIELD

The present disclosure generally relates to systems, methods, and devices for assisting a user rehearse a presentation.

BACKGROUND

Many people experience anxiety or "stage fright" in anticipation or during performance of a presentation before an audience. Repeated practice performing the presentation can lessen this anxiety.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

Figure 1:
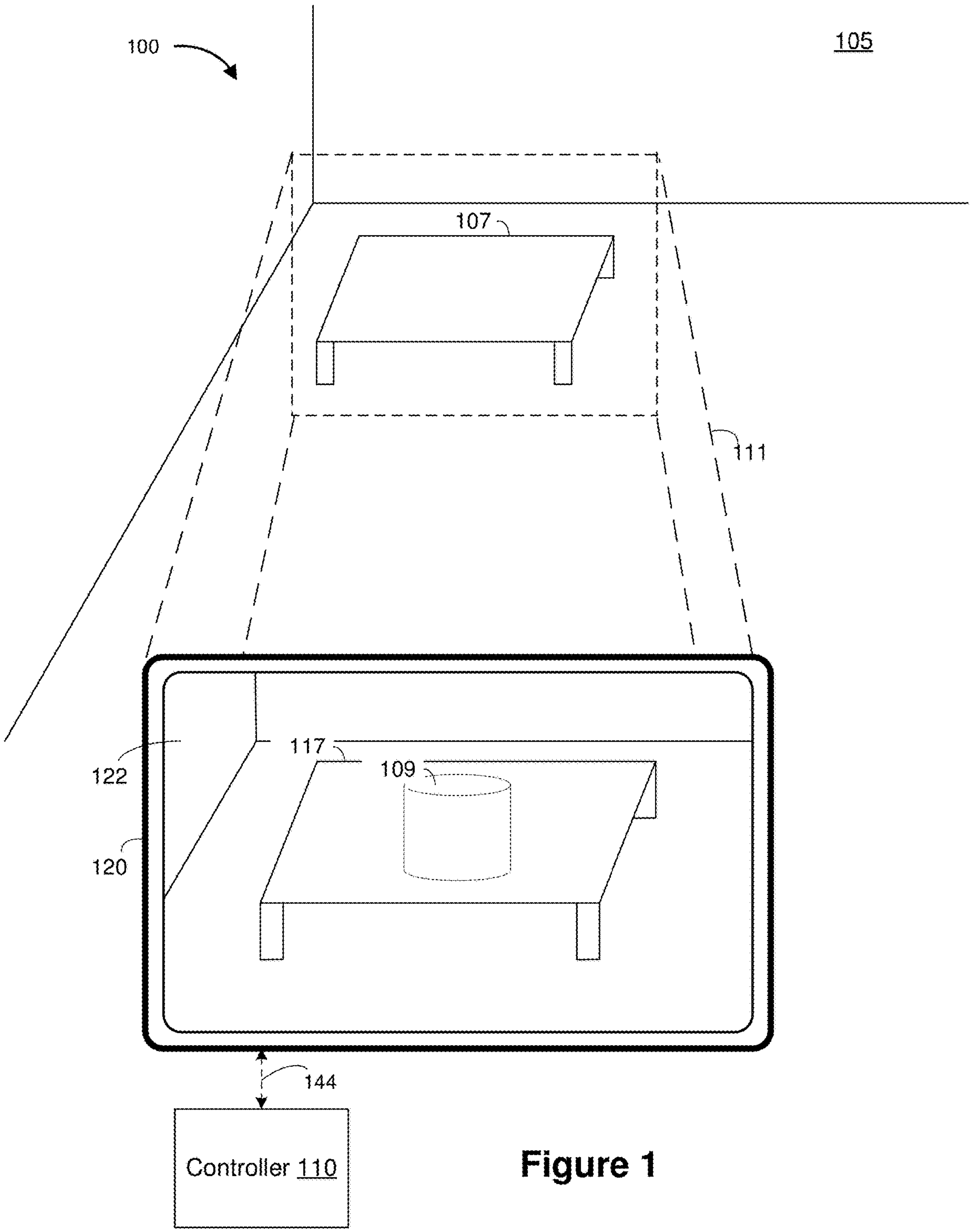
FIG. 1 is a block diagram of an example operating environment in accordance with some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

SUMMARY

Various implementations disclosed herein include devices, systems, and methods for assisting in the rehearsal of a presentation. In various implementations, the method is performed by a device including a display, one or more processors, and non-transitory memory. The method includes obtaining a difficulty level for a rehearsal of a presentation based on a difficulty level for a prior rehearsal of the presentation and a rating of the prior rehearsal of the presentation. The method includes displaying, on the display, one or more slides of the presentation. The method includes displaying, on the display in association with a volumetric environment, one or more virtual objects based on the difficulty level.

Various implementations disclosed herein include devices, systems, and methods for providing feedback on a performance of a presentation. In various implementations, the method is performed by a device including a display, one or more processors, and non-transitory memory. The method includes displaying, on the display, one or more slides of a presentation. The method includes recording audio of a user during a performance of the presentation. The method includes generating feedback based on comparing the audio of the user to previously recorded audio of the user during a prior performance of the presentation. The method includes providing the feedback to the user.

In accordance with some implementations, a device includes one or more processors, a non-transitory memory, and one or more programs; the one or more programs are stored in the non-transitory memory and configured to be executed by the one or more processors. The one or more programs include instructions for performing or causing performance of any of the methods described herein. In accordance with some implementations, a non-transitory computer readable storage medium has stored therein instructions, which, when executed by one or more processors of a device, cause the device to perform or cause performance of any of the methods described herein. In accordance with some implementations, a device includes: one or more processors, a non-transitory memory, and means for performing or causing performance of any of the methods described herein.

DESCRIPTION

People may sense or interact with a physical environment or world without using an electronic device. Physical features, such as a physical object or surface, may be included within a physical environment. For instance, a physical environment may correspond to a physical city having physical buildings, roads, and vehicles. People may directly sense or interact with a physical environment through various means, such as smell, sight, taste, hearing, and touch. This can be in contrast to an extended reality (XR) environment that may refer to a partially or wholly simulated environment that people may sense or interact with using an electronic device. The XR environment may include virtual reality (VR) content, mixed reality (MR) content, augmented reality (AR) content, or the like. Using an XR system, a portion of a person's physical motions, or representations thereof, may be tracked and, in response, properties of virtual objects in the XR environment may be changed in a way that complies with at least one law of nature. For example, the XR system may detect a user's head movement and adjust auditory and graphical content presented to the user in a way that simulates how sounds and views would change in a physical environment. In other examples, the XR system may detect movement of an electronic device (e.g., a laptop, tablet, mobile phone, or the like) presenting the XR environment. Accordingly, the XR system may adjust auditory and graphical content presented to the user in a way that simulates how sounds and views would change in a physical environment. In some instances, other inputs, such as a representation of physical motion (e.g., a voice command), may cause the XR system to adjust properties of graphical content.

Numerous types of electronic systems may allow a user to sense or interact with an XR environment. A non-exhaustive list of examples includes lenses having integrated display capability to be placed on a user's eyes (e.g., contact lenses), heads-up displays (HUDs), projection-based systems, head mountable systems, windows or windshields having integrated display technology, headphones/earphones, input systems with or without haptic feedback (e.g., handheld or wearable controllers), smartphones, tablets, desktop/laptop computers, and speaker arrays. Head mountable systems may include an opaque display and one or more speakers. Other head mountable systems may be configured to receive an opaque external display, such as that of a smartphone. Head mountable systems may capture images/video of the physical environment using one or more image sensors or capture audio of the physical environment using one or more microphones. Instead of an opaque display, some head mountable systems may include a transparent or translucent display. Transparent or translucent displays may direct light representative of images to a user's eyes through a medium, such as a hologram medium, optical waveguide, an optical combiner, optical reflector, other similar technologies, or combinations thereof. Various display technologies, such as liquid crystal on silicon, LEDs, uLEDs, OLEDs, laser scanning light source, digital light projection, or combinations thereof, may be used. In some examples, the transparent or translucent display may be selectively controlled to become opaque. Projection-based systems may utilize retinal projection technology that projects images onto a user's retina or may project virtual content into the physical environment, such as onto a physical surface or as a hologram.

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices, and circuits have not been described in exhaustive detail so as not to obscure more pertinent aspects of the example implementations described herein.

As noted above, it is common for a person to feel anxiety or "stage fright" in anticipation or during performance of a presentation before other people. Repeated rehearsal increases a user's confidence in his or her ability to perform the presentation and can lessen this anxiety. Further, rehearsal under various different circumstances, such as in different locations or in front of different people, can best reduce this anxiety as the performer becomes more confident that the presentation will be well-given under any set of circumstances. Accordingly, in various implementations, an electronic device provides various XR environments, with various levels of difficulty, in which a user can rehearse a presentation.

In various implementations, the electronic device further provides feedback to the user regarding performance of the presentation, either during a rehearsal or a live presentation. Such feedback may be provided during the performance of the presentation or when the performance of the presentation has concluded. Feedback further boosts user confidence and reduces anxiety.

FIG. 1 is a block diagram of an example operating environment 100 in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the operating environment 100 includes a controller 110 and an electronic device 120.

In some implementations, the controller 110 is configured to manage and coordinate an XR experience for the user. In some implementations, the controller 110 includes a suitable combination of software, firmware, and/or hardware. The controller 110 is described in greater detail below with respect to FIG. 2. In some implementations, the controller 110 is a computing device that is local or remote relative to the physical environment 105. For example, the controller 110 is a local server located within the physical environment 105. In another example, the controller 110 is a remote server located outside of the physical environment 105 (e.g., a cloud server, central server, etc.). In some implementations, the controller 110 is communicatively coupled with the electronic device 120 via one or more wired or wireless communication channels 144 (e.g., BLUETOOTH, IEEE 802.11x, IEEE 802.16x, IEEE 802.3x, etc.). In another example, the controller 110 is included within the enclosure of the electronic device 120. In some implementations, the functionalities of the controller 110 are provided by and/or combined with the electronic device 120.

In some implementations, the electronic device 120 is configured to provide the XR experience to the user. In some implementations, the electronic device 120 includes a suitable combination of software, firmware, and/or hardware. According to some implementations, the electronic device 120 presents, via a display 122, XR content to the user while the user is physically present within the physical environment 105 that includes a table 107 within the field-of-view 111 of the electronic device 120. As such, in some implementations, the user holds the electronic device 120 in his/her hand(s). In some implementations, while providing XR content, the electronic device 120 is configured to display an XR object (e.g., an XR cylinder 109) and to enable video pass-through of the physical environment 105 (e.g., including a representation 117 of the table 107) on a display 122. The electronic device 120 is described in greater detail below with respect to FIG. 3.

According to some implementations, the electronic device 120 provides an XR experience to the user while the user is virtually and/or physically present within the physical environment 105.

In some implementations, the user wears the electronic device 120 on his/her head. For example, in some implementations, the electronic device includes a head-mounted system (HMS), head-mounted device (HMD), or head-mounted enclosure (HME). As such, the electronic device 120 includes one or more XR displays provided to display the XR content. For example, in various implementations, the electronic device 120 encloses the field-of-view of the user. In some implementations, the electronic device 120 is a handheld device (such as a smartphone or tablet) configured to present XR content, and rather than wearing the electronic device 120, the user holds the device with a display directed towards the field-of-view of the user and a camera directed towards the physical environment 105. In some implementations, the handheld device can be placed within an enclosure that can be worn on the head of the user. In some implementations, the electronic device 120 is replaced with an XR chamber, enclosure, or room configured to present XR content in which the user does not wear or hold the electronic device 120.

Figure 2:
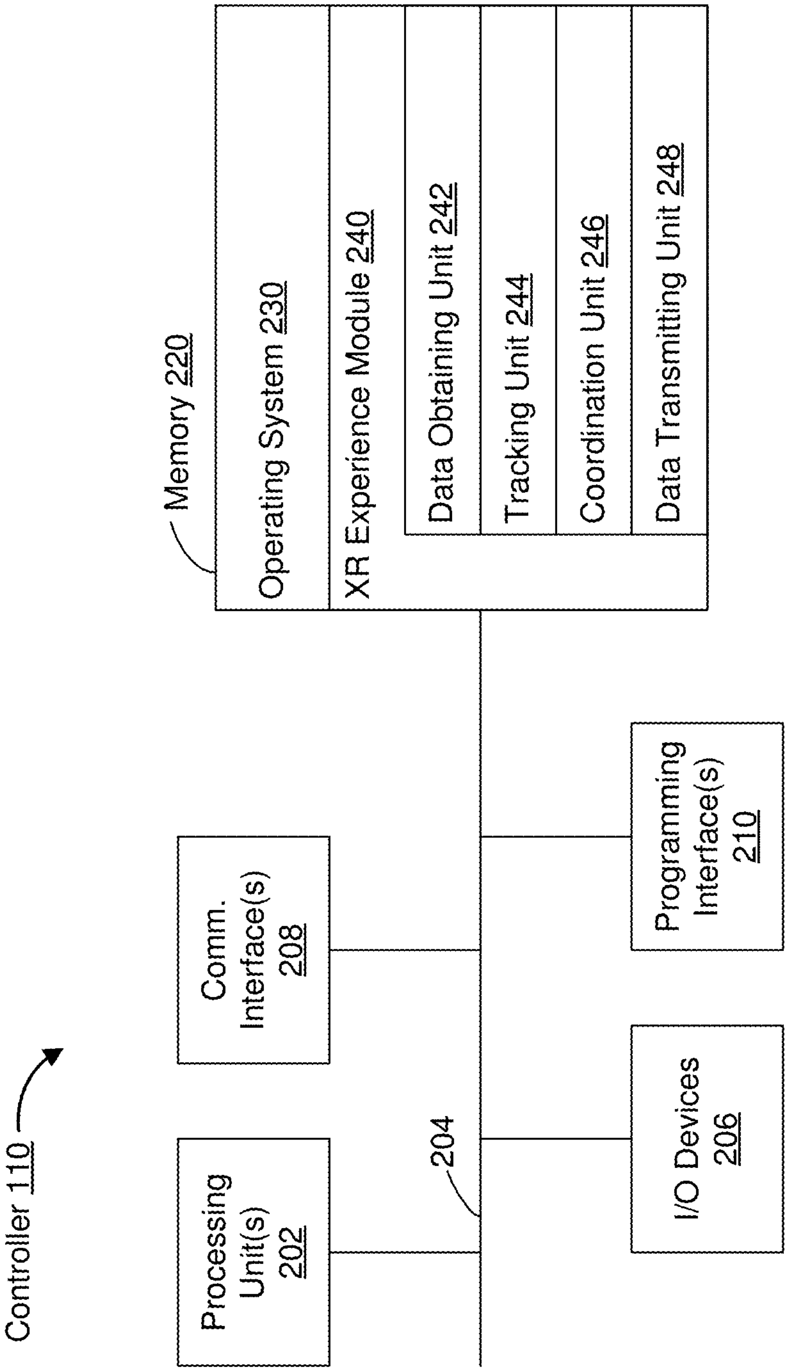
FIG. 2 is a block diagram of an example controller in accordance with some implementations.

FIG. 2 is a block diagram of an example of the controller 110 in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the controller 110 includes one or more processing units 202 (e.g., microprocessors, application-specific integrated-circuits (ASICs), field-programmable gate arrays (FPGAs), graphics processing units (GPUs), central processing units (CPUs), processing cores, and/or the like), one or more input/output (I/O) devices 206, one or more communication interfaces 208 (e.g., universal serial bus (USB), FIREWIRE, THUNDERBOLT, IEEE 802.3x, IEEE 802.11x, IEEE 802.16x, global system for mobile communications (GSM), code division multiple access (CDMA), time division multiple access (TDMA), global positioning system (GPS), infrared (IR), BLUETOOTH, ZIGBEE, and/or the like type interface), one or more programming (e.g., I/O) interfaces 210, a memory 220, and one or more communication buses 204 for interconnecting these and various other components.

In some implementations, the one or more communication buses 204 include circuitry that interconnects and controls communications between system components. In some implementations, the one or more I/O devices 206 include at least one of a keyboard, a mouse, a touchpad, a joystick, one or more microphones, one or more speakers, one or more image sensors, one or more displays, and/or the like.

The memory 220 includes high-speed random-access memory, such as dynamic random-access memory (DRAM), static random-access memory (SRAM), double-data-rate random-access memory (DDR RAM), or other random-access solid-state memory devices. In some implementations, the memory 220 includes non-volatile memory, such as one or more magnetic disk storage devices, optical disk storage devices, flash memory devices, or other non-volatile solid-state storage devices. The memory 220 optionally includes one or more storage devices remotely located from the one or more processing units 202. The memory 220 comprises a non-transitory computer readable storage medium. In some implementations, the memory 220 or the non-transitory computer readable storage medium of the memory 220 stores the following programs, modules and data structures, or a subset thereof including an optional operating system 230 and an XR experience module 240.

The operating system 230 includes procedures for handling various basic system services and for performing hardware dependent tasks. In some implementations, the XR experience module 240 is configured to manage and coordinate one or more XR experiences for one or more users (e.g., a single XR experience for one or more users, or multiple XR experiences for respective groups of one or more users). To that end, in various implementations, the XR experience module 240 includes a data obtaining unit 242, a tracking unit 244, a coordination unit 246, and a data transmitting unit 248.

In some implementations, the data obtaining unit 242 is configured to obtain data (e.g., presentation data, interaction data, sensor data, location data, etc.) from at least the electronic device 120 of FIG. 1. To that end, in various implementations, the data obtaining unit 242 includes instructions and/or logic therefor, and heuristics and metadata therefor.

In some implementations, the tracking unit 244 is configured to map the physical environment 105 and to track the position/location of at least the electronic device 120 with respect to the physical environment 105 of FIG. 1. To that end, in various implementations, the tracking unit 244 includes instructions and/or logic therefor, and heuristics and metadata therefor.

In some implementations, the coordination unit 246 is configured to manage and coordinate the XR experience presented to the user by the electronic device 120. To that end, in various implementations, the coordination unit 246 includes instructions and/or logic therefor, and heuristics and metadata therefor.

In some implementations, the data transmitting unit 248 is configured to transmit data (e.g., presentation data, location data, etc.) to at least the electronic device 120. To that end, in various implementations, the data transmitting unit 248 includes instructions and/or logic therefor, and heuristics and metadata therefor.

Although the data obtaining unit 242, the tracking unit 244, the coordination unit 246, and the data transmitting unit 248 are shown as residing on a single device (e.g., the controller 110), it should be understood that in other implementations, any combination of the data obtaining unit 242, the tracking unit 244, the coordination unit 246, and the data transmitting unit 248 may be located in separate computing devices.

Moreover, FIG. 2 is intended more as functional description of the various features that may be present in a particular implementation as opposed to a structural schematic of the implementations described herein. As recognized by those of ordinary skill in the art, items shown separately could be combined and some items could be separated. For example, some functional modules shown separately in FIG. 2 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, and/or firmware chosen for a particular implementation.

Figure 3:
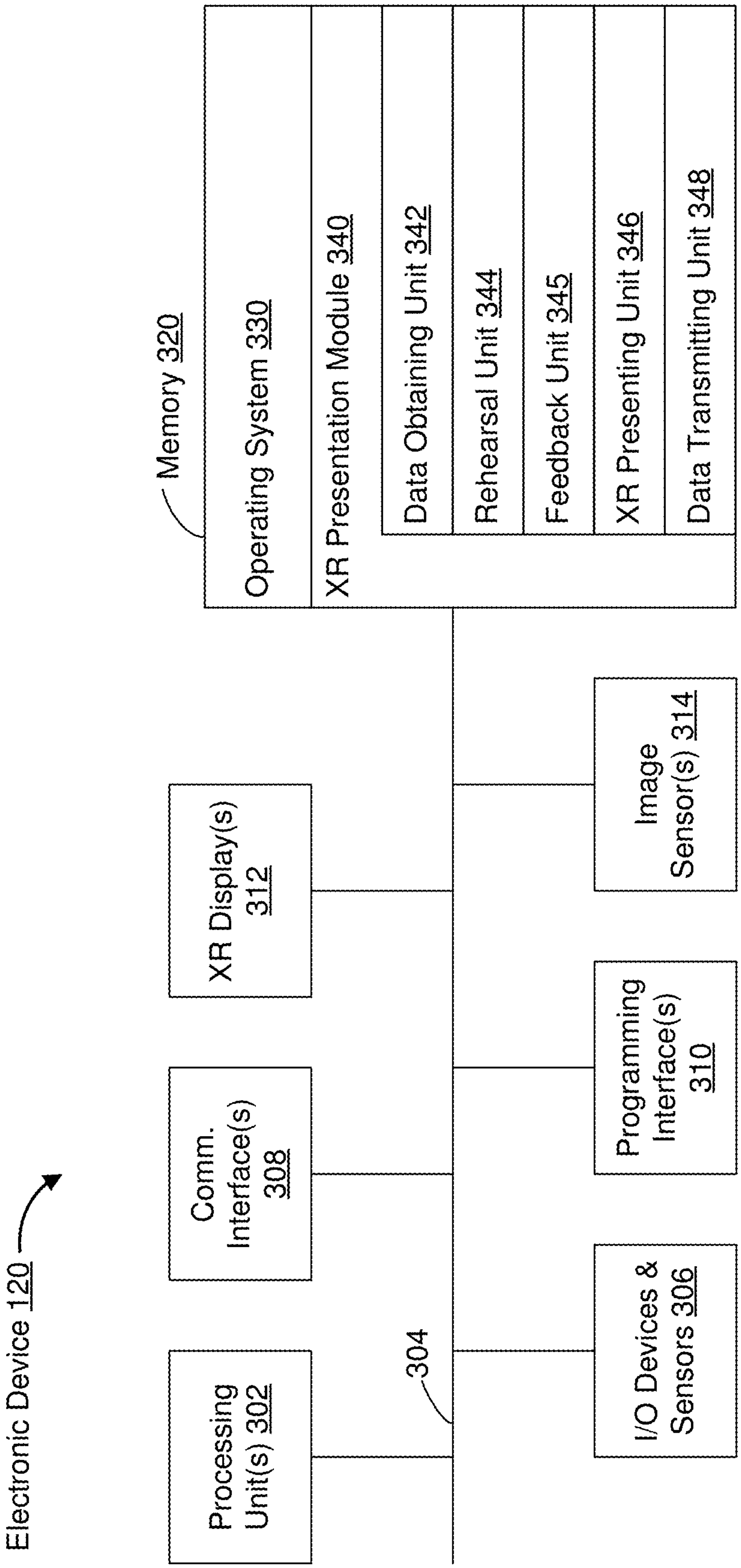
FIG. 3 is a block diagram of an example electronic device in accordance with some implementations.

FIG. 3 is a block diagram of an example of the electronic device 120 in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the electronic device 120 includes one or more processing units 302 (e.g., microprocessors, ASICs, FPGAs, GPUs, CPUs, processing cores, and/or the like), one or more input/output (I/O) devices and sensors 306, one or more communication interfaces 308 (e.g., USB, FIREWIRE, THUNDERBOLT, IEEE 802.3x, IEEE 802.11x, IEEE 802.16x, GSM, CDMA, TDMA, GPS, IR, BLUETOOTH, ZIGBEE, and/or the like type interface), one or more programming (e.g., I/O) interfaces 310, one or more XR displays 312, one or more optional interior- and/or exterior-facing image sensors 314, a memory 320, and one or more communication buses 304 for interconnecting these and various other components.

In some implementations, the one or more communication buses 304 include circuitry that interconnects and controls communications between system components. In some implementations, the one or more I/O devices and sensors 306 include at least one of an inertial measurement unit (IMU), an accelerometer, a gyroscope, a thermometer, one or more physiological sensors (e.g., blood pressure monitor, heart rate monitor, blood oxygen sensor, blood glucose sensor, etc.), one or more microphones, one or more speakers, a haptics engine, one or more depth sensors (e.g., a structured light, a time-of-flight, or the like), and/or the like.

In some implementations, the one or more XR displays 312 are configured to provide the XR experience to the user. In some implementations, the one or more XR displays 312 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electro-mechanical system (MEMS), and/or the like display types. In some implementations, the one or more XR displays 312 correspond to diffractive, reflective, polarized, holographic, etc. waveguide displays. For example, the electronic device 120 includes a single XR display. In another example, the electronic device includes an XR display for each eye of the user. In some implementations, the one or more XR displays 312 are capable of presenting MR and VR content.

In some implementations, the one or more image sensors 314 are configured to obtain image data that corresponds to at least a portion of the face of the user that includes the eyes of the user (and may be referred to as an eye-tracking camera). In some implementations, the one or more image sensors 314 are configured to be forward-facing so as to obtain image data that corresponds to the scene as would be viewed by the user if the electronic device 120 was not present (and may be referred to as a scene camera). The one or more optional image sensors 314 can include one or more RGB cameras (e.g., with a complimentary metal-oxide-semiconductor (CMOS) image sensor or a charge-coupled device (CCD) image sensor), one or more infrared (IR) cameras, one or more event-based cameras, and/or the like.

The memory 320 includes high-speed random-access memory, such as DRAM, SRAM, DDR RAM, or other random-access solid-state memory devices. In some implementations, the memory 320 includes non-volatile memory, such as one or more magnetic disk storage devices, optical disk storage devices, flash memory devices, or other non-volatile solid-state storage devices. The memory 320 optionally includes one or more storage devices remotely located from the one or more processing units 302. The memory 320 comprises a non-transitory computer readable storage medium. In some implementations, the memory 320 or the non-transitory computer readable storage medium of the memory 320 stores the following programs, modules and data structures, or a subset thereof including an optional operating system 330 and an XR presentation module 340.

The operating system 330 includes procedures for handling various basic system services and for performing hardware dependent tasks. In some implementations, the XR presentation module 340 is configured to present XR content to the user via the one or more XR displays 312. To that end, in various implementations, the XR presentation module 340 includes a data obtaining unit 342, a rehearsal unit 344, a feedback unit 345, an XR presenting unit 346, and a data transmitting unit 348.

In some implementations, the data obtaining unit 342 is configured to obtain data (e.g., presentation data, interaction data, sensor data, location data, etc.) from at least the controller 110 of FIG. 1. To that end, in various implementations, the data obtaining unit 342 includes instructions and/or logic therefor, and heuristics and metadata therefor.

In some implementations, the rehearsal unit 344 is configured to obtain XR content based on a difficulty level of a presentation rehearsal. To that end, in various implementations, the rehearsal unit 344 includes instructions and/or logic therefor, and heuristics and metadata therefor.

In some implementations, the feedback unit 345 is configured to generate feedback by comparing a current presentation (either a rehearsal or a live presentation) to previously recorded rehearsals of the presentation. To that end, in various implementations, the feedback unit 345 includes instructions and/or logic therefor, and heuristics and metadata therefor.

In some implementations, the XR presenting unit 346 is configured to present XR content via the one or more XR displays 312, such as a representation of the selected text input field at a location proximate to the text input device. To that end, in various implementations, the XR presenting unit 346 includes instructions and/or logic therefor, and heuristics and metadata therefor.

In some implementations, the data transmitting unit 348 is configured to transmit data (e.g., presentation data, location data, etc.) to at least the controller 110. In some implementations, the data transmitting unit 348 is configured to transmit authentication credentials to the electronic device. To that end, in various implementations, the data transmitting unit 348 includes instructions and/or logic therefor, and heuristics and metadata therefor.

Although the data obtaining unit 342, the rehearsal unit 344, the feedback unit 345, the XR presenting unit 346, and the data transmitting unit 348 are shown as residing on a single device (e.g., the electronic device 120), it should be understood that in other implementations, any combination of the data obtaining unit 342 the rehearsal unit 344, the feedback unit 345, the XR presenting unit 346, and the data transmitting unit 348 may be located in separate computing devices.

Moreover, FIG. 3 is intended more as a functional description of the various features that could be present in a particular implementation as opposed to a structural schematic of the implementations described herein. As recognized by those of ordinary skill in the art, items shown separately could be combined and some items could be separated. For example, some functional modules shown separately in FIG. 3 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, and/or firmware chosen for a particular implementation.

FIGS. 4A-4D, 5A-5D, and 6A-6G illustrate various XR environments displayed by an electronic device as a user performs a number of rehearsals of a presentation as various difficulty levels. In particular, FIGS. 4A-4D illustrate a first XR environment 400 as a user performs a first rehearsal of the presentation at a first difficulty level, FIGS. 5A-5D illustrate a second XR environment 500 as a user performs a second rehearsal of the presentation at a second difficulty level greater (e.g., more difficult) than the first difficulty level, and FIGS. 6A-6G illustrate a third XR environment 600 as a user performs a third rehearsal of the presentation at a third difficulty level greater (e.g., more difficult) than the second difficulty level. In various implementations, the various XR environments include various virtual objects based on the corresponding difficulty level.

FIGS. 4A-4D illustrate the first XR environment 400 displayed, at least in part, by a display of the electronic device. The first XR environment 400 is based on a physical environment of a living room in which the electronic device is present. FIGS. 4A-4D illustrate the first XR environment 400 during a series of time periods. In various implementations, each time period is an instant, a fraction of a second, a few seconds, a few hours, a few days, or any length of time.

The first XR environment 400 includes a plurality of objects, including one or more physical objects (e.g., a picture 401 and a couch 402) of the physical environment and one or more virtual objects (e.g., virtual animals 411A-411B and a slide window 412). In various implementations, certain objects (such as the physical objects 401 and 402 and the virtual animals 411A-411B) are displayed at a location in the first XR environment 400, e.g., at a location defined by three coordinates in a three-dimensional (3D) XR coordinate system. Accordingly, when the electronic device moves in the first XR environment 400 (e.g., changes either position and/or orientation), the objects are moved on the display of the electronic device, but retain their location in the first XR environment 400. Such virtual objects that, in response to motion of the electronic device, move on the display, but retain their position in the XR environment are referred to as world-locked objects. In various implementations, certain virtual objects (such as the slide window 412) are displayed at locations on the display such that when the electronic device moves in the first XR environment 400, the objects are stationary on the display on the electronic device. Such virtual objects that, in response to motion of the electronic device, retain their location on the display are referred to as head-locked objects or display-locked objects.

Figure 4A:
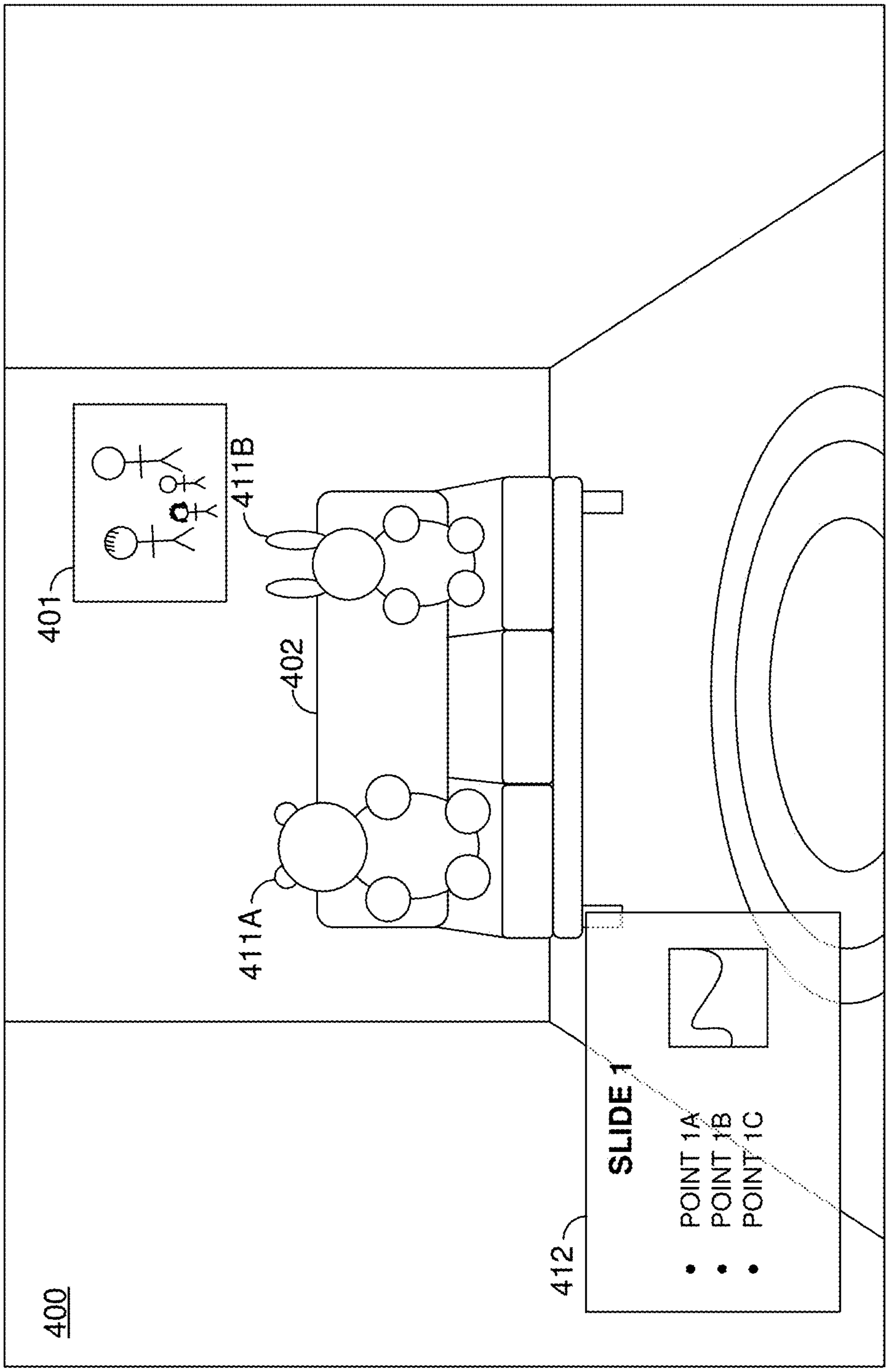
FIGS. 4A-4D illustrate a first XR environment during a first performance of a presentation in accordance with some implementations.

FIG. 4A illustrates the first XR environment 400 during a first time period. During the first time period, the electronic device displays the virtual animals 411A-411B on the couch 402. During the first time period, the electronic device displays the slide window 412 displaying a first slide of a presentation. In various implementations, the slide window 412 is displayed at a fixed location on the display. In various implementations, the size and/or the location of the slide window 412 is manipulable by a user of the electronic device. For example, in various implementations, the user provides user input to move the slide window 412 to a different location on the display. As another example, in various implementations, the user provides user input to change a size of the slide window 412. In various implementations, the slide window 412 is at least partially transparent.

During the first time period, the user provides a next-slide user input to change the slide window 412 to display the next slide of the presentation. In various implementations, the user input is a hand gesture or a vocal command.

Figure 4B:
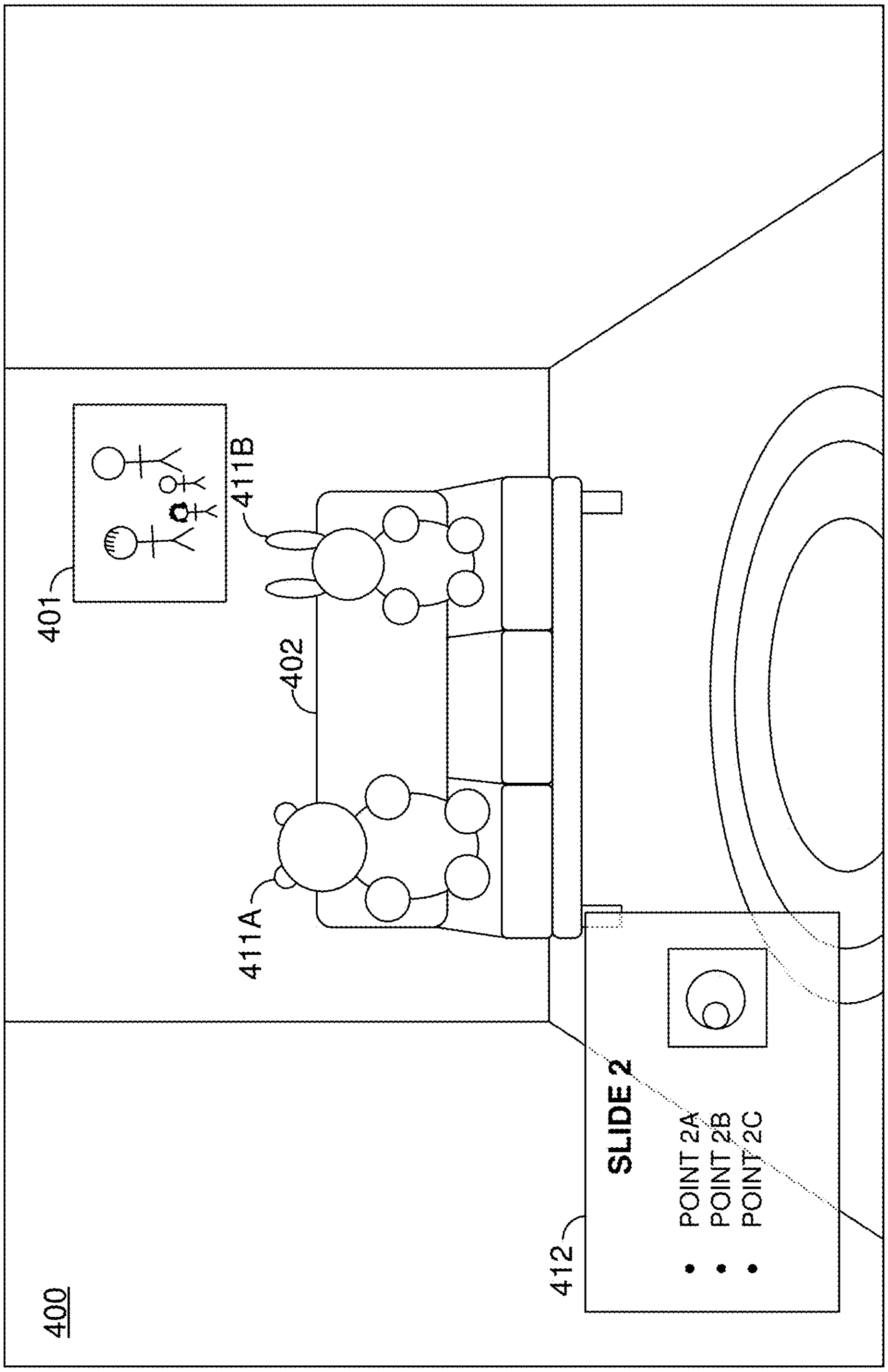

FIG. 4B illustrates the first XR environment 400 during a second time period subsequent to the first time period. During the second time period, in response to the next-slide user input, the slide window 412 displays a second slide of the presentation. During the second time period, the user provides a next-slide user input.

Figure 4C:
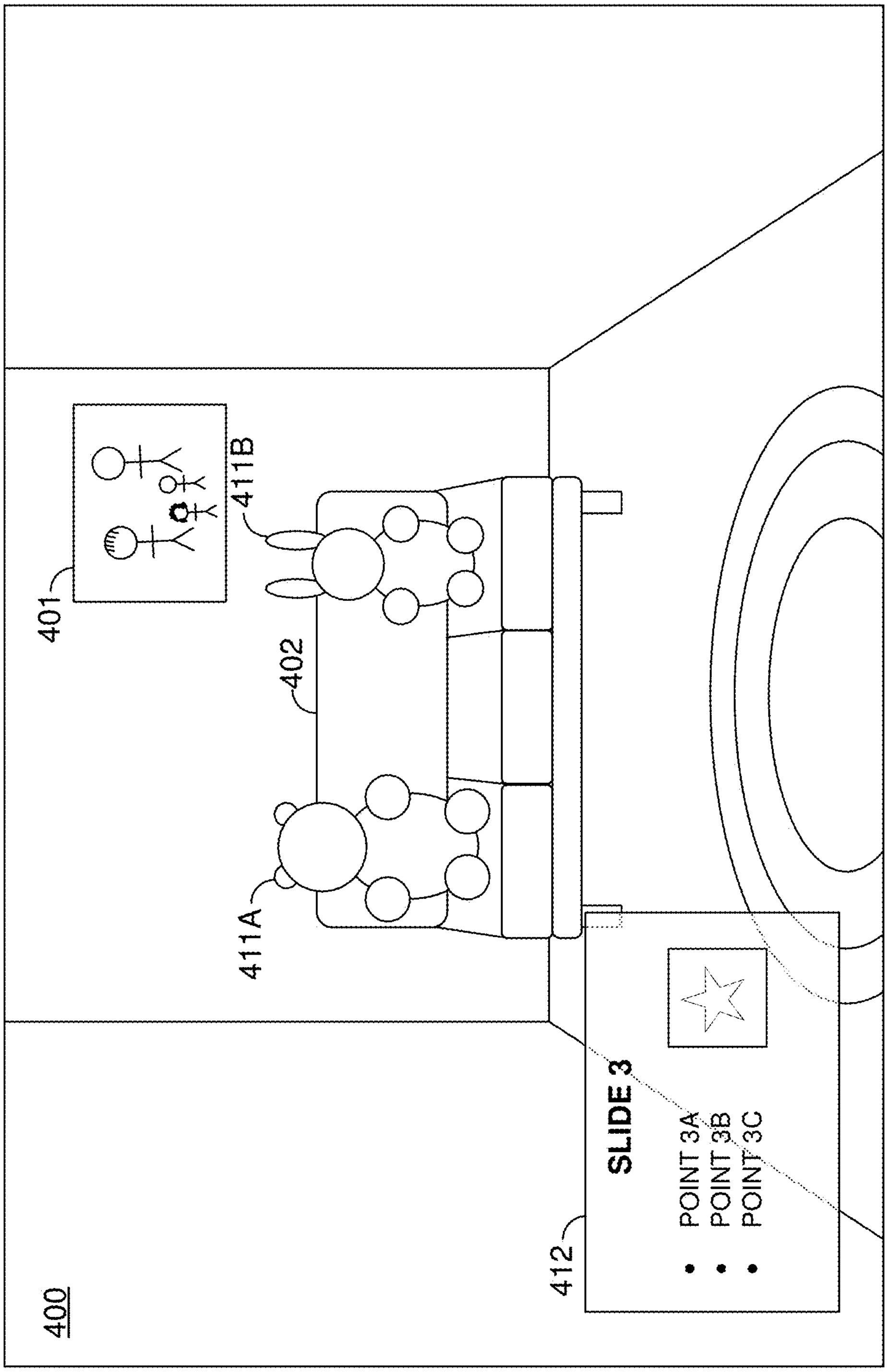

FIG. 4C illustrates the first XR environment 400 during a third time period subsequent to the second time period. During the third time period, in response to the next-slide user input, the slide window 412 displays a third slide of the presentation. During the third time period, the user provides a next-slide user input.

During the first time period, second time period, and third time period (referred to collectively as the rehearsal time period) the user performs a rehearsal of the presentation by speaking. During the rehearsal time period, the electronic device records audio of the user performing the rehearsal of the presentation (e.g., audio of the user speaking). The electronic device generates feedback based on the audio of the user. In various implementations, the electronic device generates feedback based on other data collected during the rehearsal time period, such as eye gaze tracking data or biometric data.

Figure 4D:
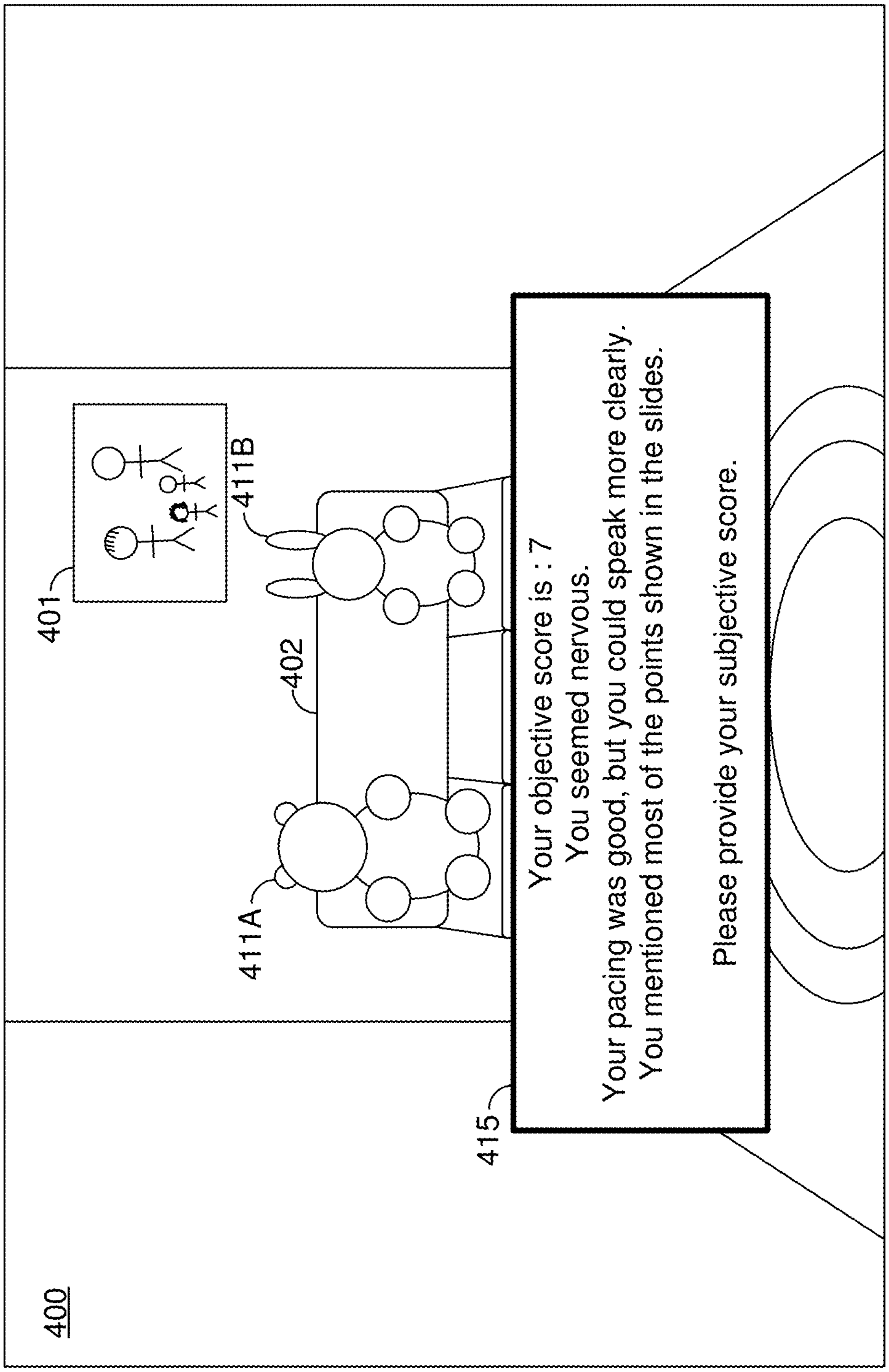

FIG. 4D illustrates the first XR environment 400 during a fourth time period subsequent to the third time period. During the fourth time period, in response to the next-slide user input and in accordance with a determination that the third slide was the final slide of the presentation, the slide window 412 is replaced with a feedback window 415. The feedback window 415 is a display-locked virtual object that includes the feedback generated based on the audio of the user and/or other data collected during the rehearsal time period.

For example, in FIG. 4D, the feedback window 415 indicates that the user seemed nervous, e.g., by analyzing vocal characteristics of the audio of the user, gaze, posture, movement, and/or biometrics such as heart rate, skin temperature and/or resistance, or pupil dilation. The feedback window 415 indicates that the user spoke at a decent pace, but could speak more clearly, e.g., by analyzing the speed of speech and performing speech recognition. The feedback window 415 indicates that the user mentioned most of the points in the presentation, e.g., by performing speech recognition and comparing the recognized speech to the text of the slides.

The feedback window 415 includes an objective score based on the audio of the user and/or other data collected during the rehearsal time period. Further, the feedback window 415 requests a subjective score from the user to indicate how the user would score their performance of the rehearsal of the presentation. In various implementations, the user provides the subjective score via user input, such as a vocal response.

For the rehearsal of the presentation, the electronic device stores the audio of the user and/or other data collected during the rehearsal time period and further stores the objective score and the subjective score.

FIGS. 5A-5D illustrate the second XR environment 500 displayed, at least in part, by a display of the electronic device. The second XR environment 500 is a virtual environment of a classroom. FIGS. 5A-5D illustrate the second XR environment 500 during a series of time periods. In various implementations, each time period is an instant, a fraction of a second, a few seconds, a few hours, a few days, or any length of time.

The second XR environment 500 includes a plurality of virtual objects including a virtual chair 521, a virtual desk 522, virtual students 511A-511C, and a slide window 512. In various implementations, certain objects (such as the virtual chair 521, the virtual desk 522, and the virtual students 511A-511C) are displayed at a location in the second XR environment 500, e.g., at a location defined by three coordinates in a three-dimensional (3D) XR coordinate system. Accordingly, when the electronic device moves in the second XR environment 500 (e.g., changes either position and/or orientation), the objects are moved on the display of the electronic device, but retain their location in the second XR environment 500. In various implementations, certain virtual objects (such as the slide window 512) are displayed at locations on the display such that when the electronic device moves in the second XR environment 500, the objects are stationary on the display on the electronic device.

Figure 5A:
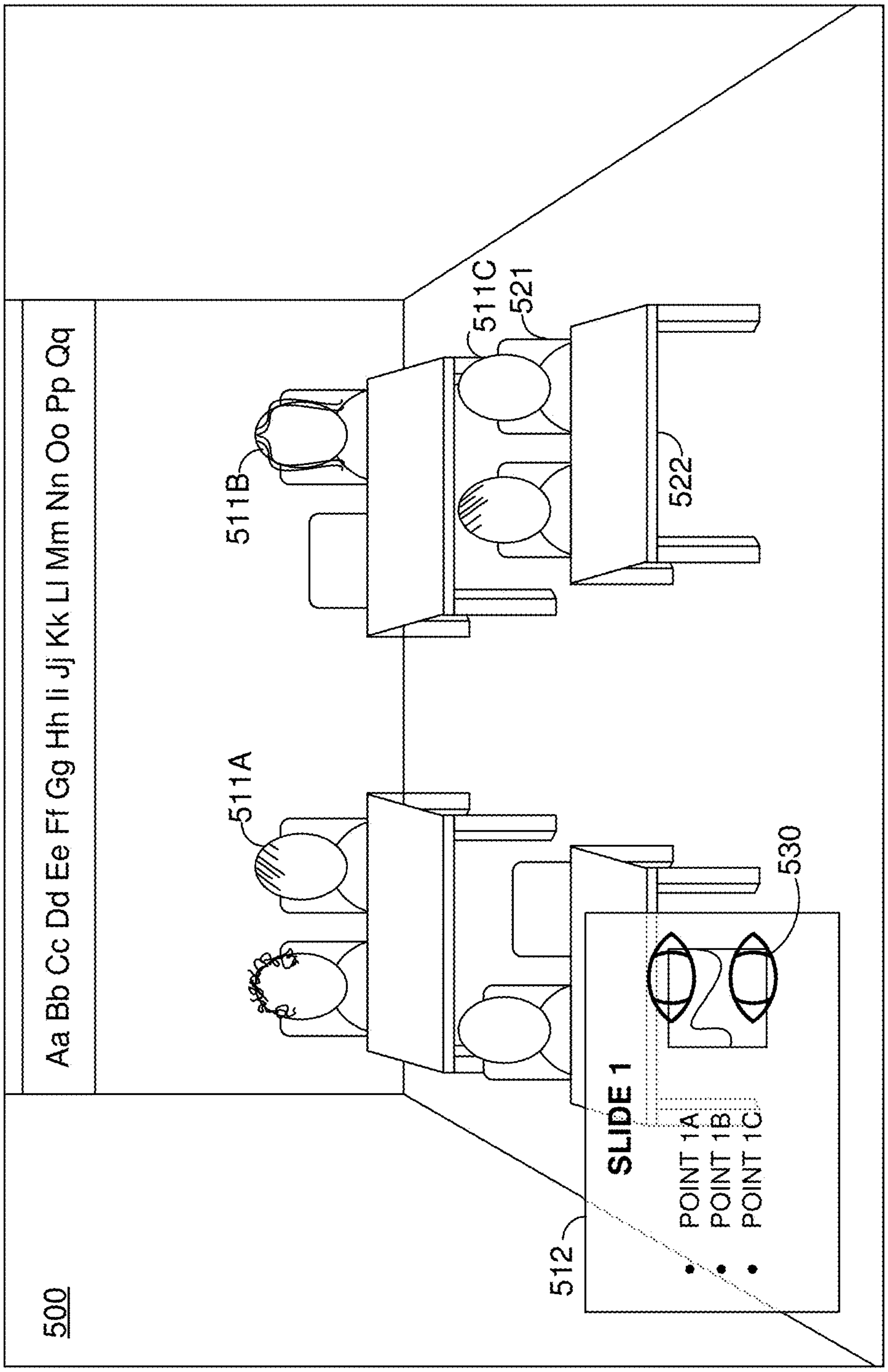
FIGS. 5A-5D illustrate a second XR environment during a second performance of the presentation in accordance with some implementations.

FIG. 5A illustrates the second XR environment 500 during a first time period. During the first time period, the electronic device displays the virtual students 511A-511C sitting in virtual chairs behind virtual desks (such as the virtual student 511C sitting in the virtual chair 521 behind the virtual desk 522). During the first time period, the electronic device displays the slide window 512 displaying the first slide of the presentation. Further, the slide window 512 displays an eye tracking indicator 530 over a portion of the first slide of the presentation. The eye tracking indicator 530 indicates a portion of the slide at which audience members are gazing based on audience eye tracking data obtained by the electronic device. In FIG. 5A, because the second XR environment 500 includes no physical audience members, the electronic device generates (rather than receives) the audience eye tracking data.

During the first time period, the user provides a next-slide user input to change the slide window 512 to display the next slide of the presentation.

Figure 5B:
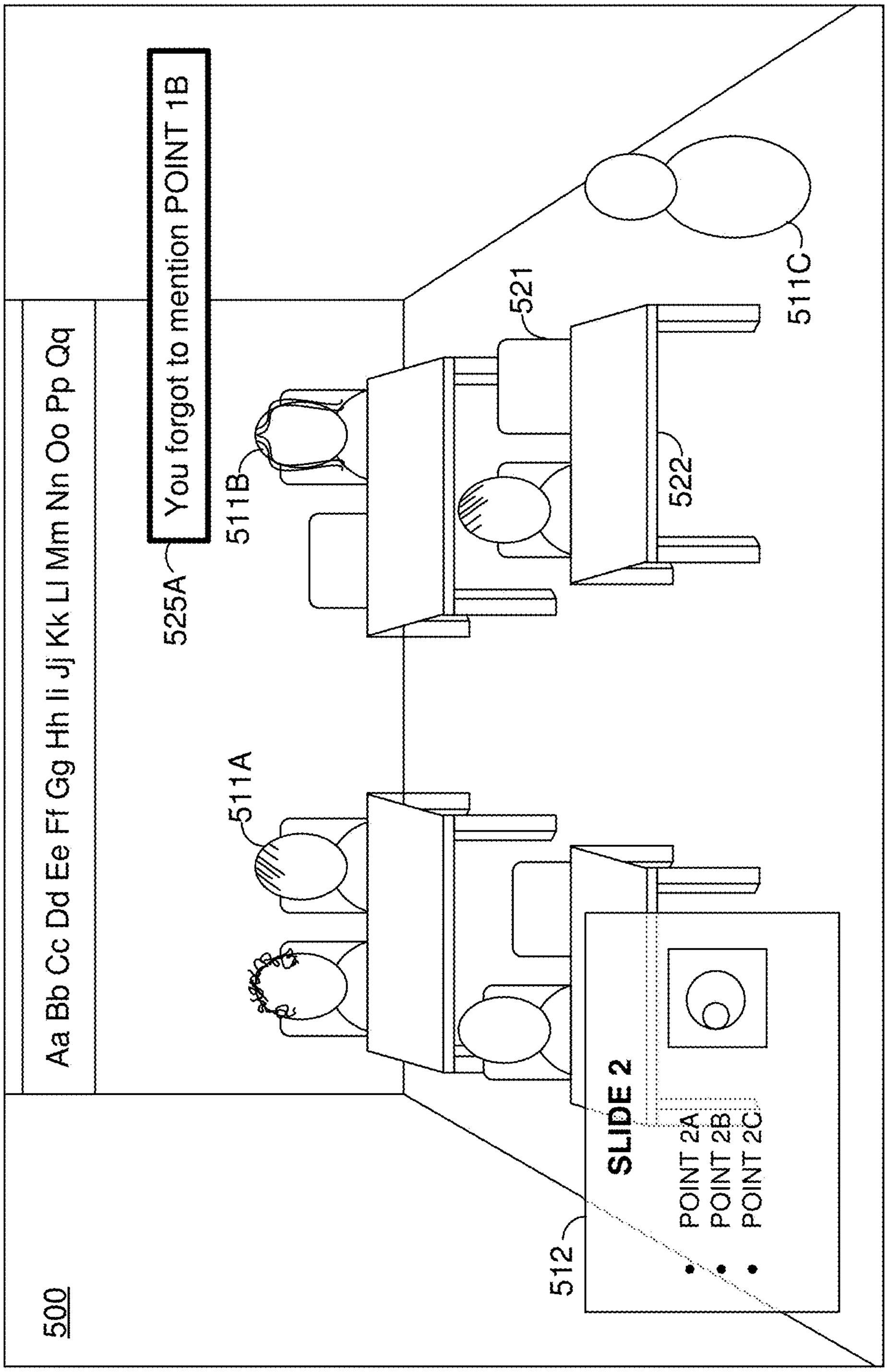

FIG. 5B illustrates the second XR environment 500 during a second time period subsequent to the first time period. During the second time period, in response to the next-slide user input, the slide window 512 displays a second slide of the presentation.

During the second time period, the second XR environment 500 includes a first feedback notification 525A. During the first time period, the electronic device records audio of the user performing a first portion of rehearsal of the presentation (e.g., audio of the user speaking). Based on comparing the audio of the user to previously recorded audio of the user and/or other data (such as the text of the slides), the electronic device generates and displays feedback during the rehearsal. Thus, in comparing the audio of the user recording during the first time period to the text of the slides, the first feedback notification 525A indicates that the user has failed to mention a point of the first slide.

During the second time period, the virtual student 511C stands up from the virtual chair 521 behind the virtual desk 522 and begins to exit the classroom. During the second time period, the user provides a next-slide user input.

Figure 5C:
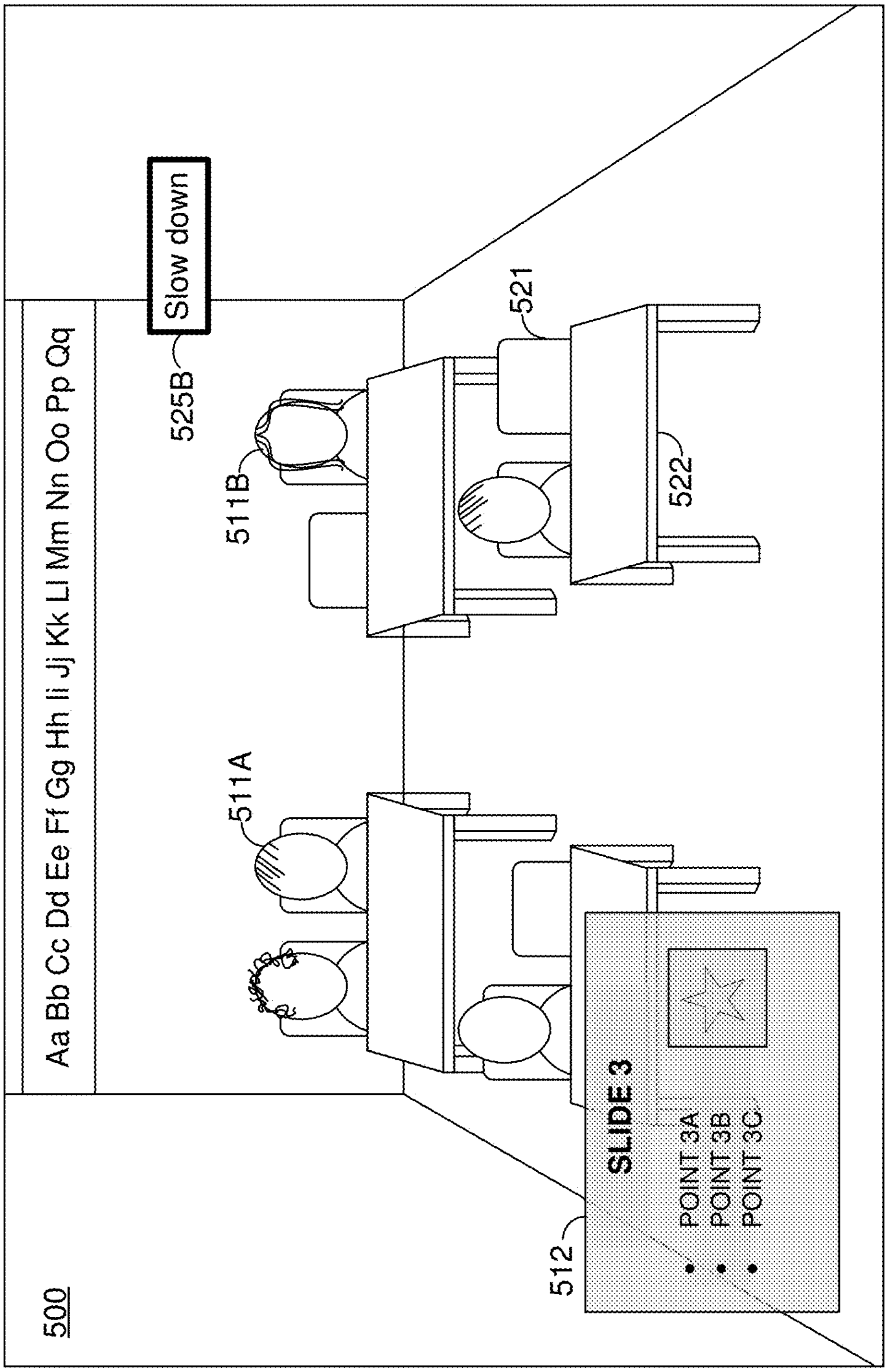

FIG. 5C illustrates the second XR environment 500 during a third time period subsequent to the second time period. During the third time period, in response to the next-slide user input, the slide window 512 displays a third slide of the presentation.

During the third time period, the second XR environment 500 includes a second feedback notification 525B. During the first time period and second time period, the electronic device records audio of the user performing a first portion and second portion of a rehearsal of the presentation (e.g., audio of the user speaking). Based on comparing the audio of the user to previously recorded audio of the user and/or other data (such as the text of the slides), the electronic device generates and displays feedback during the rehearsal. Thus, in comparing the audio of the user recording during the first time period and second time period (e.g., the amount of time of the first time period and second time period) to previously recorded rehearsals (e.g., the corresponding amount of time of previously rehearsals), the second feedback notification 525B indicates that the user should slow down. Further, to indicate the user should slow down, the slide window 512 is dimmed.

During the third time period, the virtual student 511C has exited the classroom. During the third time period, the user provides a next-slide user input.

During the first time period, second time period, and third time period (referred to collectively as the rehearsal time period) the user performs a rehearsal of the presentation by speaking. During the rehearsal time period, the electronic device records audio of the user performing the rehearsal of the presentation (e.g., audio of the user speaking). The electronic device generates feedback based on the audio of the user. In various implementations, the electronic device generates feedback based on other data collected during the rehearsal time period, such as eye gaze tracking data or biometric data.

Figure 5D:
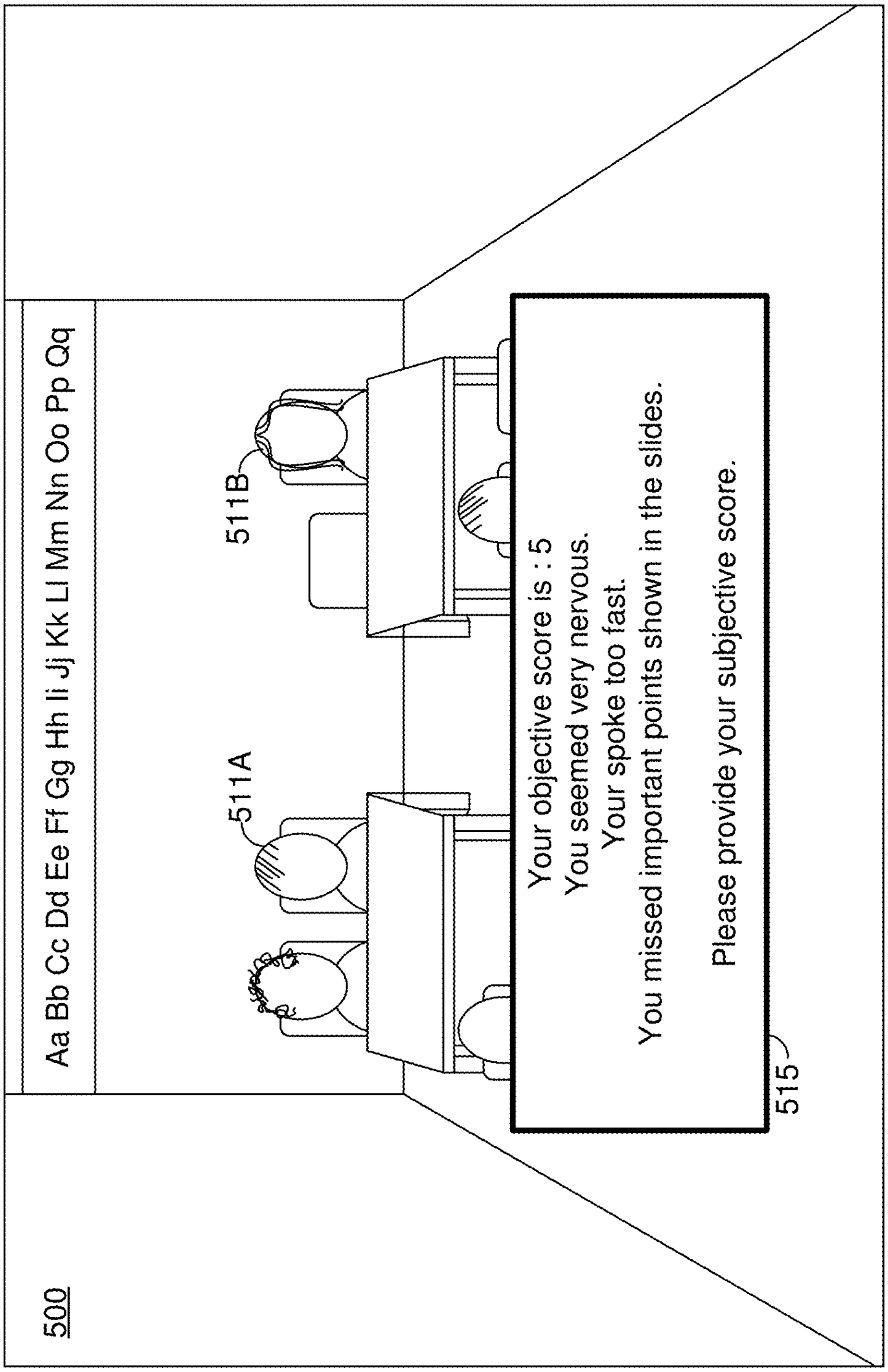

FIG. 5D illustrates the second XR environment 500 during a fourth time period subsequent to the third time period. During the fourth time period, in response to the next-slide user input and in accordance with a determination that the third slide was the final slide of the presentation, the slide window 512 is replaced with a feedback window 515.

FIGS. 6A-6G illustrate the third XR environment 600 displayed, at least in part, by a display of the electronic device. The third XR environment 600 is a virtual environment of an auditorium. FIGS. 6A-6G illustrate the third XR environment 600 during a series of time periods. In various implementations, each time period is an instant, a fraction of a second, a few seconds, a few hours, a few days, or any length of time.

The third XR environment 600 includes a plurality of virtual objects including a virtual chair 631, a virtual refreshment table 621, a virtual microphone 622, virtual audience members 611A-611E, and a slide window 612. In various implementations, certain objects (such as the virtual chair 631, the virtual refreshment table 621, the virtual microphone 622, and the virtual audience members 611A-611E) are displayed at a location in the third XR environment 600, e.g., at a location defined by three coordinates in a three-dimensional (3D) XR coordinate system. Accordingly, when the electronic device moves in the third XR environment 600 (e.g., changes either position and/or orientation), the objects are moved on the display of the electronic device, but retain their location in the third XR environment 600. In various implementations, certain virtual objects (such as the slide window 612) are displayed at locations on the display such that when the electronic device moves in the third XR environment 600, the objects are stationary on the display on the electronic device.

Figure 6A:
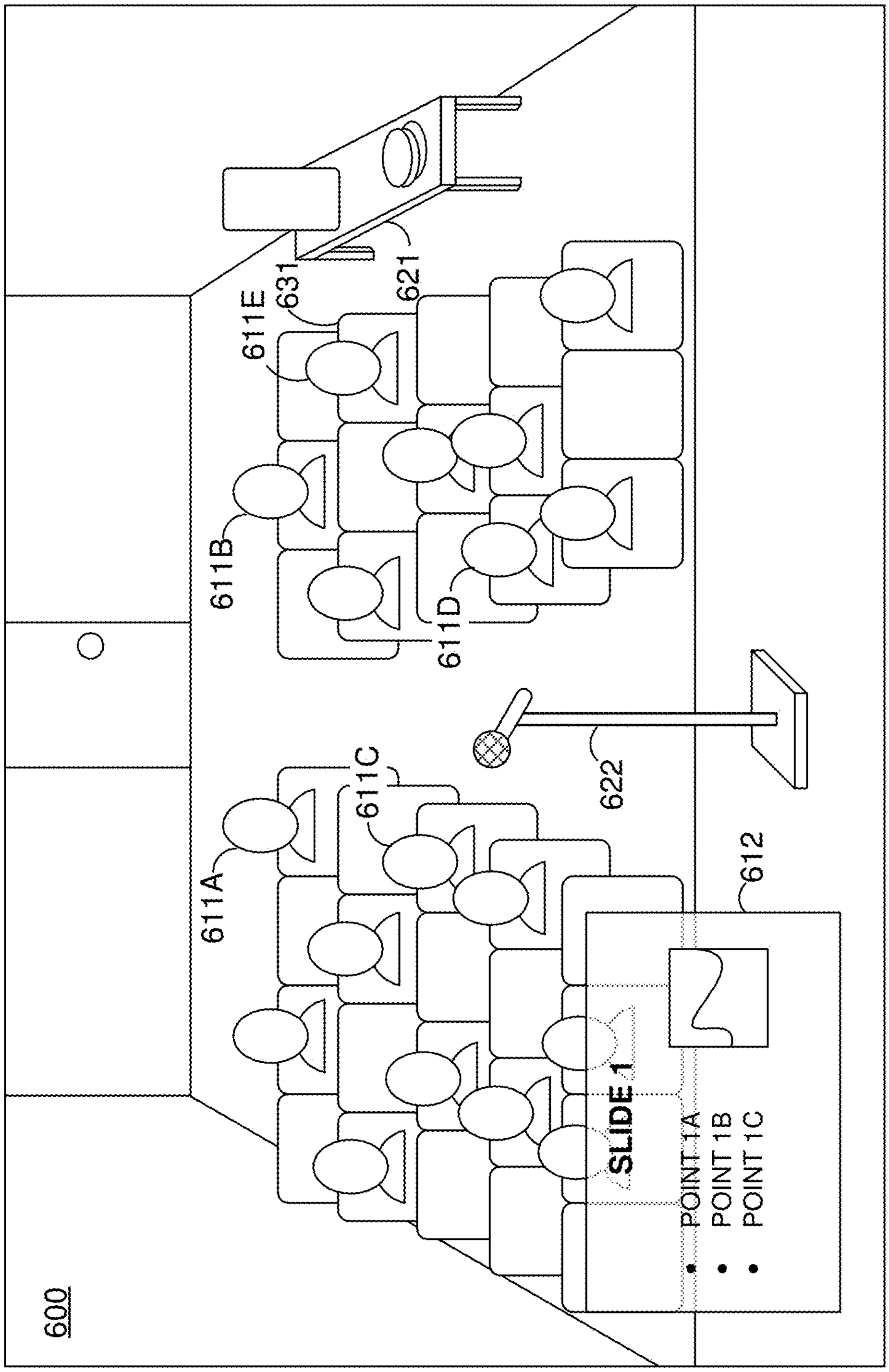
FIGS. 6A-6G illustrate a third XR environment during a third performance of the presentation in accordance with some implementations.

FIG. 6A illustrates the third XR environment 600 during a first time period. During the first time period, the electronic device displays the virtual audience members 611A-611E sitting in virtual chairs (such as the virtual audience member 611E sitting in the virtual chair 631). During the first time period, the electronic device displays the slide window 612 displaying the first slide of the presentation.

Figure 6B:
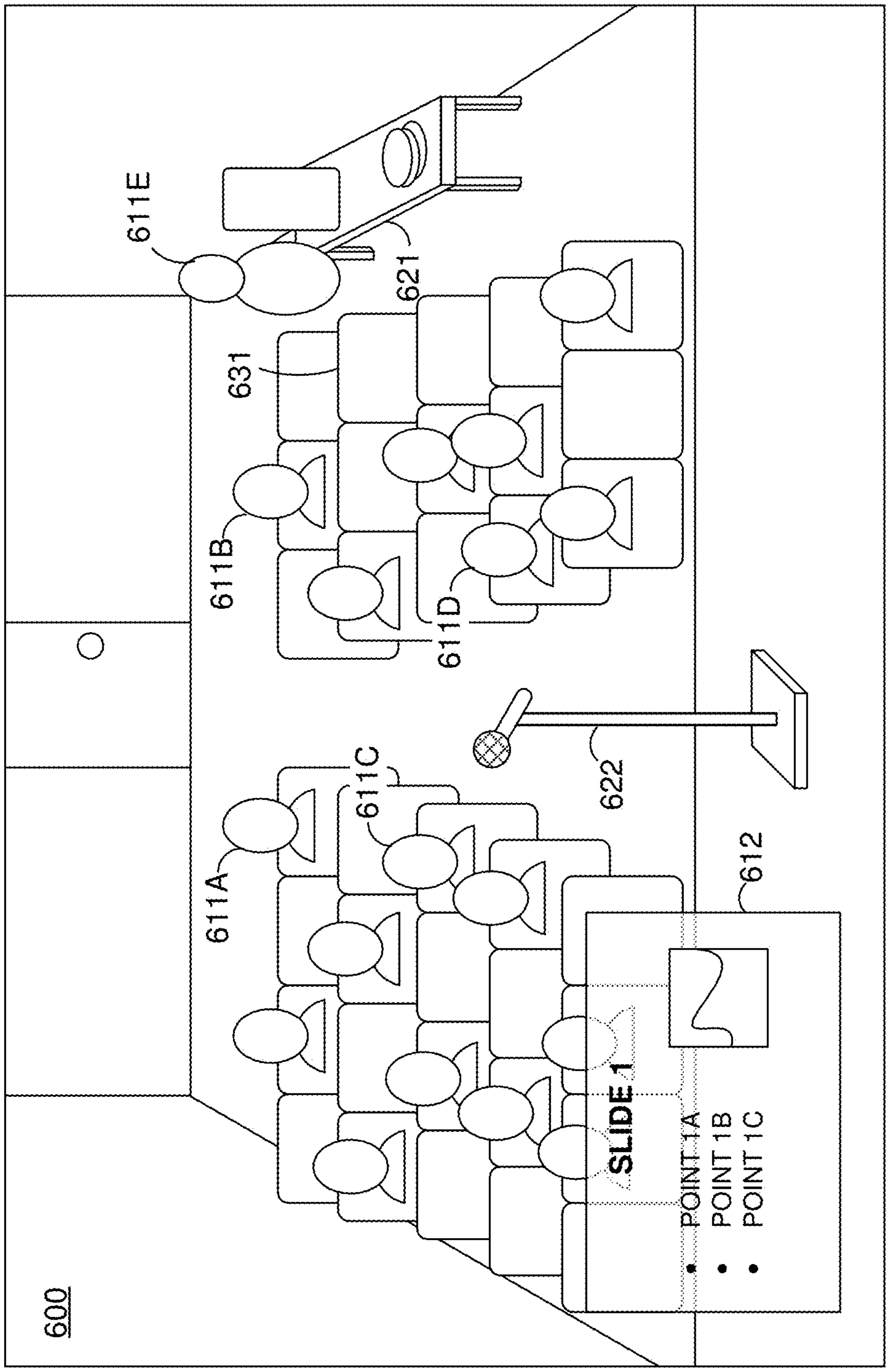

FIG. 6B illustrates the third XR environment 600 during a second time period subsequent to the first time period. During the second time period, the virtual audience member 611E has left the virtual chair 631 and moved toward the virtual refreshment table 621.

Figure 6C:
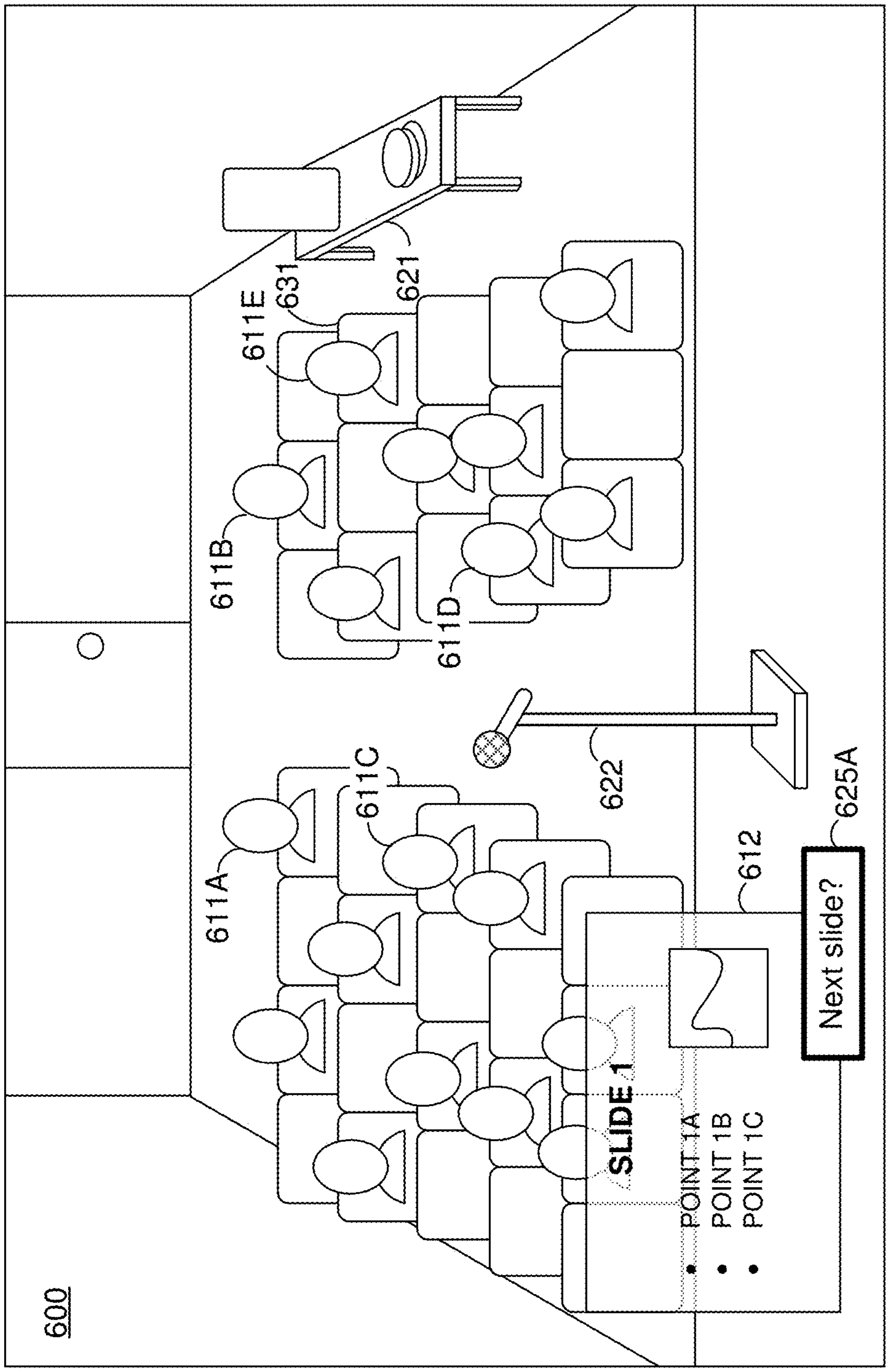

FIG. 6C illustrates the third XR environment 600 during a third time period subsequent to the second time period.

During the third time period, the virtual audience member 611E has returned to the virtual chair 631.

During the third time period, the third XR environment 600 includes a first feedback notification 625A. During the first time period and second time period, the electronic device records audio of the user performing a first portion of rehearsal of the presentation (e.g., audio of the user speaking). Based on comparing the audio of the user to previously recorded audio of the user and/or other data (such as the text of the slides), the electronic device generates and displays feedback during the rehearsal. Thus, in comparing the audio of the user recording during the first time period and the second time period to a previous recording of audio of the user performing a rehearsal of the presentation and/or the text of the slides, the first feedback notification 625A indicates that the user may have missed a slide transition, e.g., began speaking about a point on a subsequent slide without performing a next-slide gesture.

During the third time period, the user provides a next-slide user input to change the slide window 612 to display the next slide of the presentation.

Figure 6D:
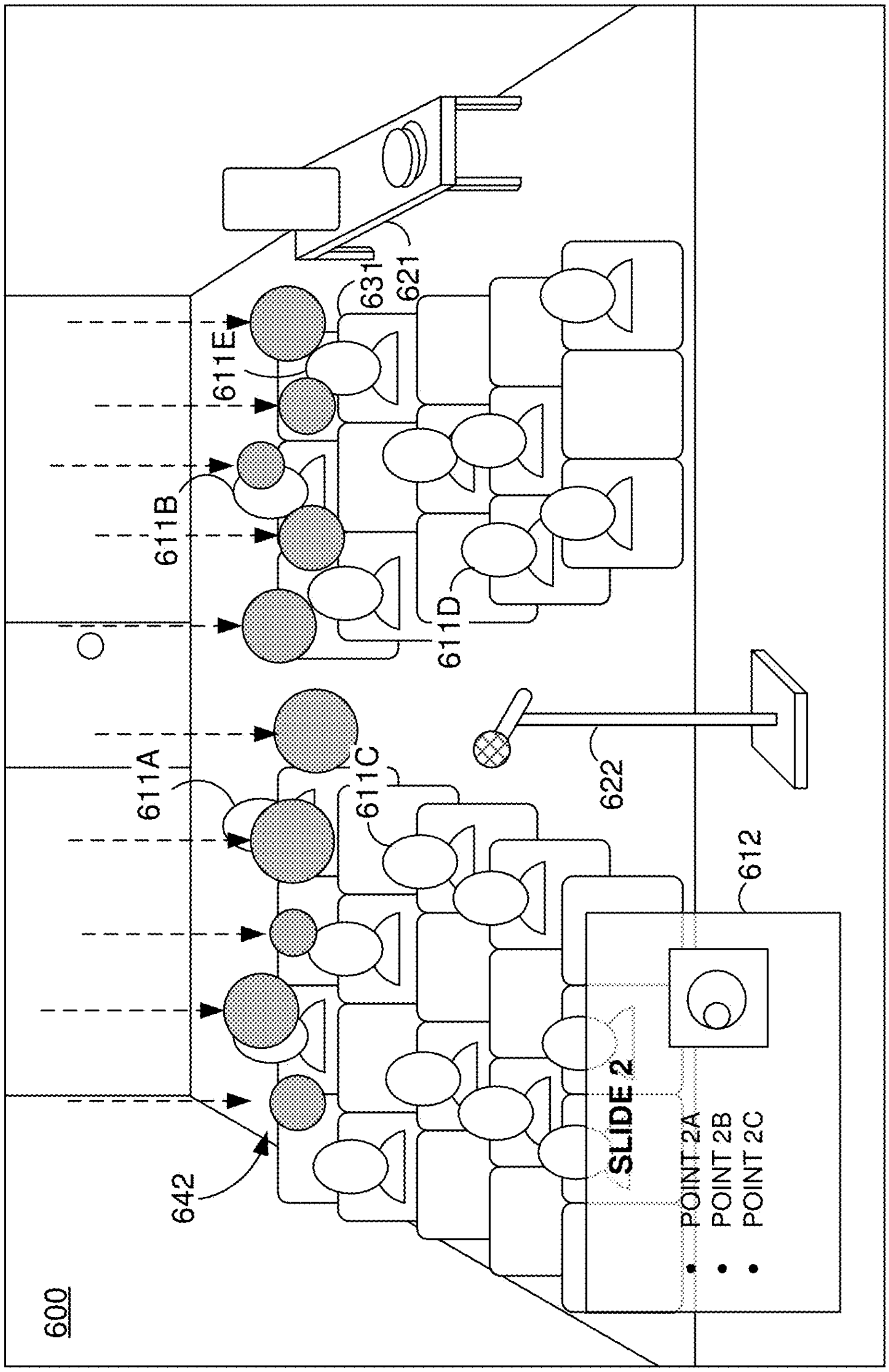

FIG. 6D illustrates the third XR environment 600 during a fourth time period subsequent to the third time period. During the fourth time period, the slide window 612 displays the second slide of the presentation. Further, during the fourth time period, the third XR environment 600 includes virtual balls 642 falling from the ceiling. Such virtual objects, such as virtual balloons, virtual lights, or virtual confetti function as a distraction for the user. Rehearsal with such distractors increases a user's confidence in presenting under any circumstances.

Figure 6E:
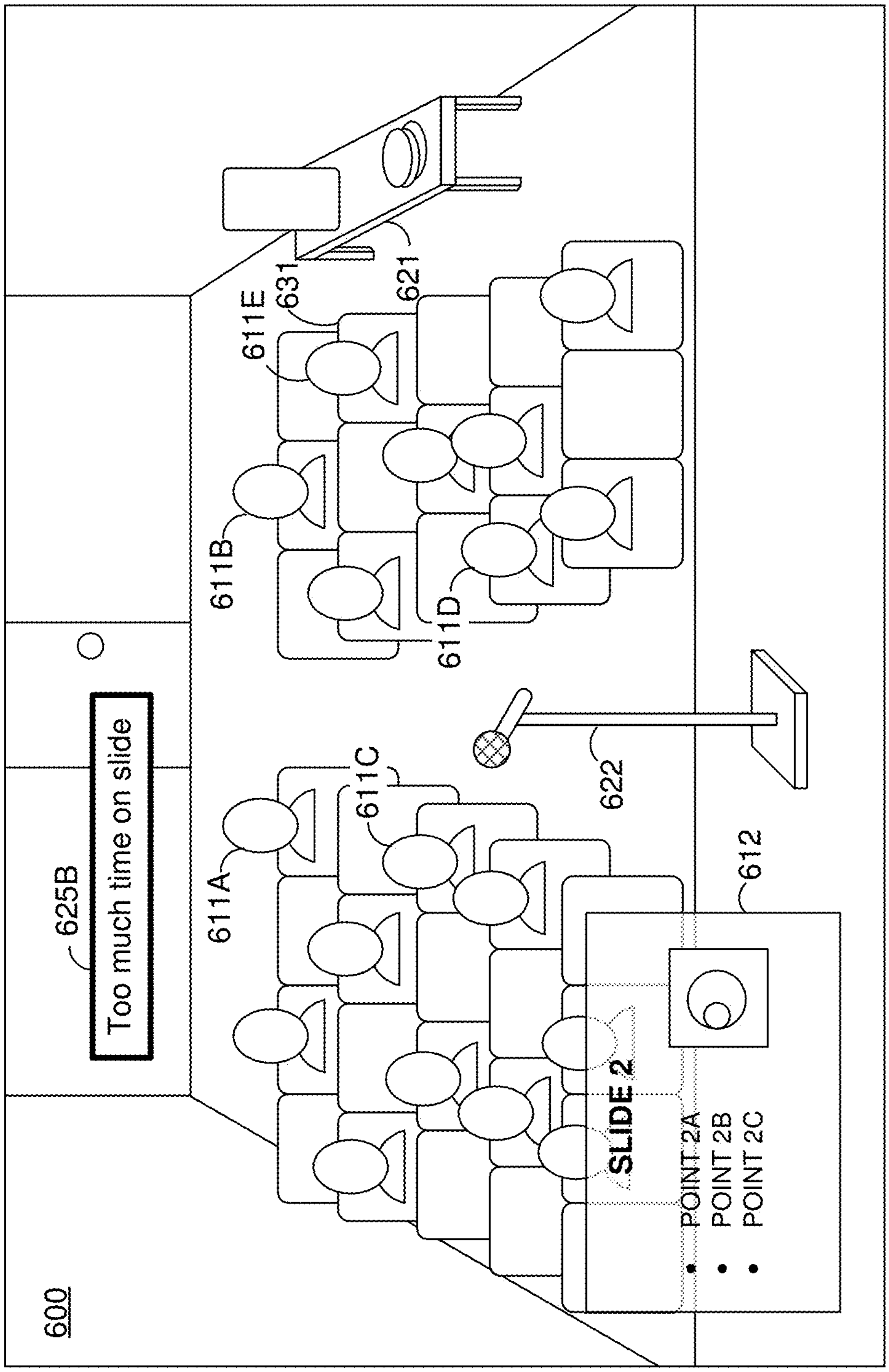

FIG. 6E illustrates the third XR environment 600 during a fifth time period subsequent to the fourth time period. During the fifth time period, the third XR environment 600 includes a second feedback notification 625B indicating that the user has spent too much time on the second slide of the presentation, e.g., in comparing the audio of the user recording during earlier time periods to a previous recording of audio of the user performing a rehearsal of the presentation.

During the fifth time period, the user provides a next-slide user input to change the slide window 612 to display the next slide of the presentation.

Figure 6F:
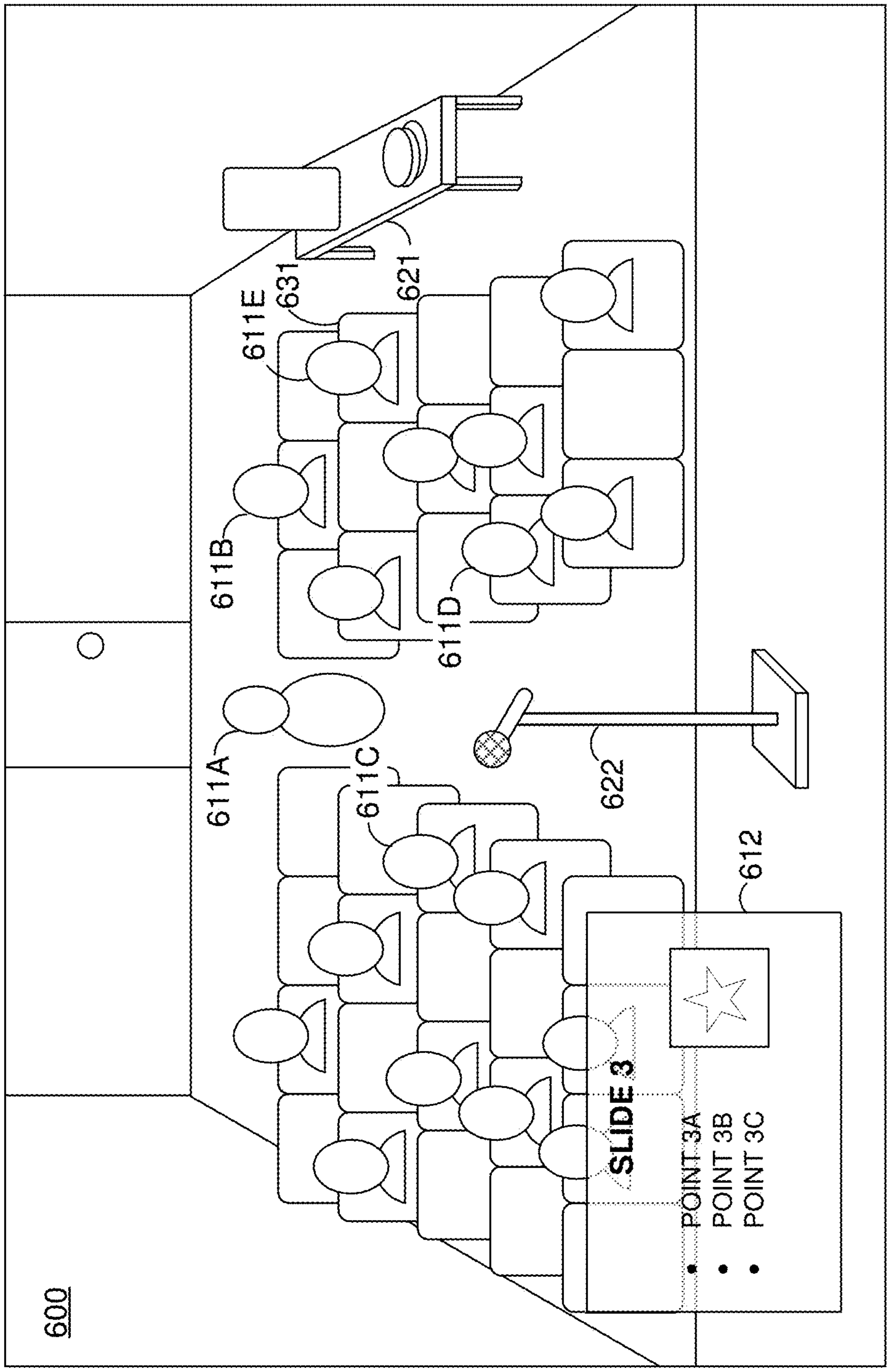

FIG. 6F illustrates the third XR environment 600 during a sixth time period subsequent to the fifth time period. During the sixth time period, the slide window 612 displays the third slide of the presentation. Further, during the sixth time period, the virtual audience member 611A has stood up to ask a question of the user. In various implementations, the question presented (e.g., via a speaker) is based on the audio of the user and/or other data collected during the rehearsal period, such as the text of the slides.

During the sixth time period, the user provides a next-slide user input to change the slide window 612 to display the next slide of the presentation.

During the first time period, second time period, third time period, fourth time period, fifth time period, and sixth time period (referred to collectively as the rehearsal time period) the user performs a rehearsal of the presentation by speaking. During the rehearsal time period, the electronic device records audio of the user performing the rehearsal of the presentation (e.g., audio of the user speaking). The electronic device generates feedback based on the audio of the user. In various implementations, the electronic device generates feedback based on other data collected during the rehearsal time period, such as eye gaze tracking data or biometric data.

Figure 6G:
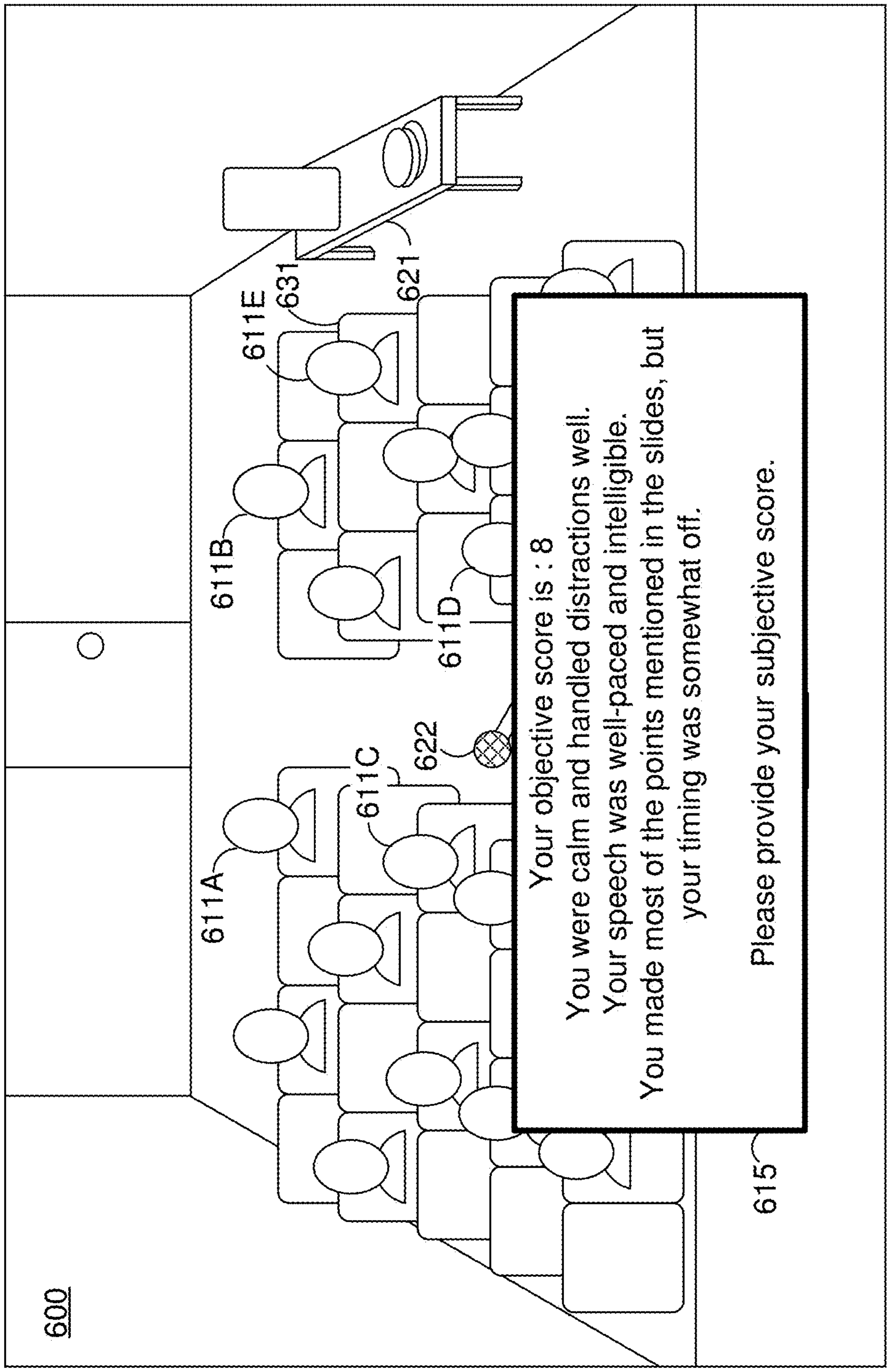

FIG. 6G illustrates the third XR environment 600 during a seventh time period subsequent to the sixth time period. During the seventh time period, in response to the next-slide user input and in accordance with a determination that the third slide was the final slide of the presentation, the slide window 612 is replaced with a feedback window 615.

Figure 7:
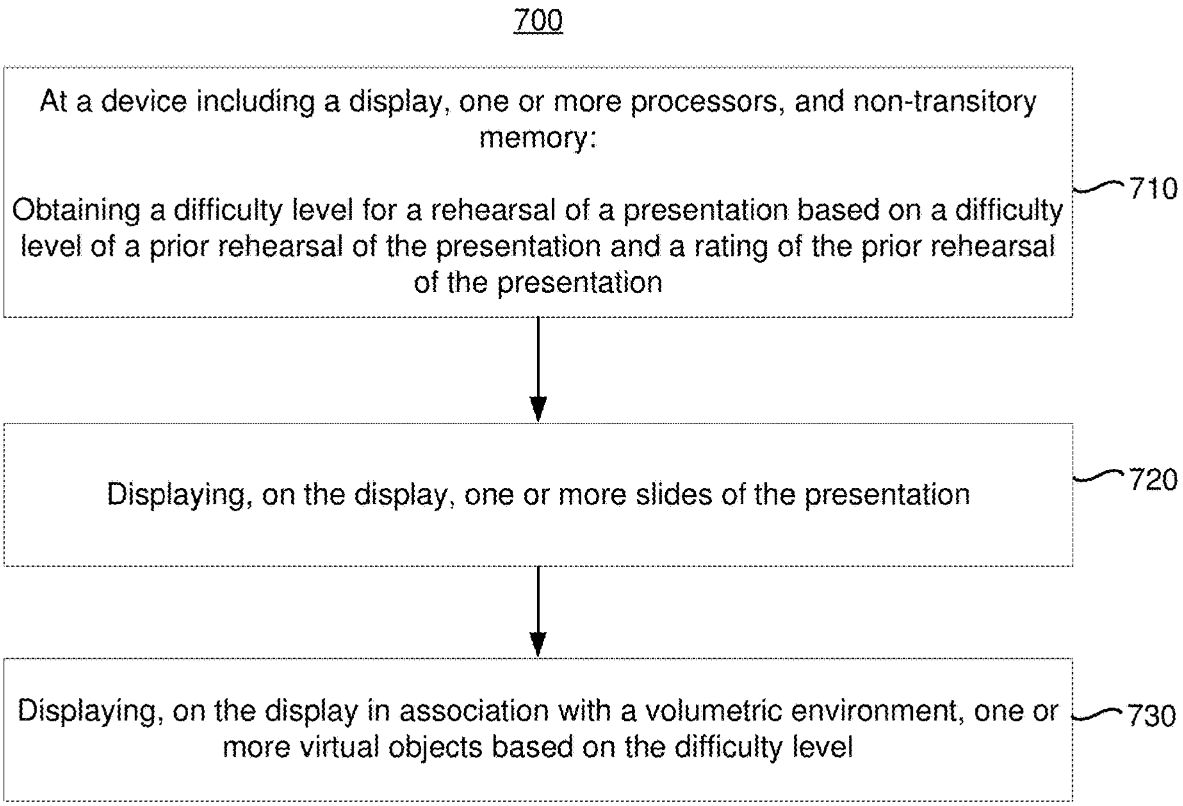
FIG. 7 is a flowchart representation of a method of assisting in the rehearsal of a presentation in accordance with some implementations.

FIG. 7 is a flowchart representation of a method 700 of assisting in the rehearsal of a presentation in accordance with some implementations. In various implementations, the method 700 is performed by a device including a display, one or more processors, and non-transitory memory (e.g., the electronic device 120 of FIG. 3). In some implementations, the method 700 is performed by processing logic, including hardware, firmware, software, or a combination thereof. In some implementations, the method 700 is performed by a processor executing instructions (e.g., code) stored in a non-transitory computer-readable medium (e.g., a memory).

The method 700 begins, in block 710, with the device obtaining a difficulty level for a rehearsal of a presentation based on a difficulty level of a prior rehearsal of the presentation and a rating of the prior rehearsal of the presentation. For example, in various implementations, upon completing a rehearsal of the presentation at a particular difficulty level and receiving a rating of the rehearsal of the presentation above a threshold, the difficulty level is increased. In various implementations, the difficulty level is based additionally or alternatively on a user input.

In various implementations, the difficulty level is a single value selected from a plurality of predefined values. For example, the difficulty level may be "easy", "moderate", "hard", or "extremely hard". As another example, the difficulty level may be a natural number between 1 and 10.

In various implementations, the difficulty level includes a plurality of different values corresponding to different virtual object sets. For example, the difficulty level can include a first value corresponding to one of a plurality of different virtual venues (e.g., "home", "school", or "classroom"), a second value corresponding to a number of virtual audience members (e.g., "few", "many", or "full house"), and a third value corresponding to a level of distraction (e.g., "none", "mild", "strong", or "extreme").

In various implementations, the difficulty level is a single value that maps to a plurality of different values corresponding to different virtual object sets. For example, a difficulty level of 1 maps to "home", "few", and "none"; a difficulty level of 3 maps to "school", "few", and "mild"; and a difficulty level of 5 maps to "school"; "many"; and "strong".

The method 700 continues, in block 720, with the device displaying, on the display, one or more slides of the presentation. For example, in FIGS. 4A-4C, the electronic device displays the slide window 412 which displays, at various times, the first, second, and third slides of the presentation. In various implementations, the device displays the one or more slides of the presentation in a slide window. In various implementations, the size and/or the location of the slide window is manipulable by a user of the device. For example, in various implementations, the user provides user input to move the slide window to a different location on the display. As another example, in various implementations, the user provides user input to change a size of the slide window. In various implementations, the slide window is at least partially transparent.

The method 700 continues, in block 730, with the device displaying, on the display in association with a volumetric environment, one or more virtual objects based on the difficulty level. For example, in FIG. 4A, the electronic device displays the virtual animals 411A-411B. As another example, in FIG. 5A, the electronic device displays the virtual students 511A-511C and the walls, floor, and other objects (e.g., the virtual chair 521 and the virtual desk 522) of a virtual classroom. As another example, in FIG. 6A, the electronic device displays the virtual audience members 611A-611E, and the wall, floors and other objects (e.g., the virtual chair 631, virtual refreshment table 621, and virtual microphone 622) of a virtual auditorium.

In various implementations, displaying the one or more virtual objects based on the difficulty level includes displaying a virtual venue based on the difficulty level. For example, in FIG. 5A, the electronic device displays a virtual classroom based on the second difficulty level and, in FIG. 6A, the electronic device displays a virtual auditorium based on the third difficulty level. In FIG. 4A, based on the first difficulty level, the electronic device does not display a virtual venue, but displays other virtual objects within the physical environment of the electronic device. Thus, in various implementations, at higher difficulty levels, the virtual venue is larger.

In various implementations, displaying the one or more virtual objects based on the difficulty level includes displaying one or more virtual audience members based on the difficulty level. For example, in FIG. 4A, the electronic device displays the virtual animals 411A-411B based on the first difficulty level, in FIG. 5A, the electronic device displays the virtual students 511A-511C based on the second difficulty level, and, in FIG. 6A, the electronic device displays the virtual audience member 611A-611E based on the third difficulty level.

In various implementations, a number of the virtual audience members is based on the difficulty level. In various implementations, at higher difficulty levels, the number of virtual audience members is larger. For example, in FIG. 4A, the number of virtual audience members (e.g., the virtual animals 411A-411B) is two based on the first difficulty level, in FIG. 5A, the number of virtual audience members (e.g., the virtual students 511A-511C) is six based on the second difficulty level, and, in FIG. 6A, the number of virtual audience members (e.g., the virtual audience members 611A-611E) is eighteen based on the third difficulty level.

In various implementations, an identity of a particular virtual audience member of the one or more virtual audience members is based on the difficulty level. In various implementations, at a first difficulty level, a particular virtual audience member is a stuffed animal or a cartoon avatar. In various implementations, at a second difficulty level higher than the first difficulty level, a particular virtual audience member is a person or photorealistic avatar. In various implementations, contacts of the user (as derived from contact information stored on the electronic device) are represented as virtual audience members. At different difficulty levels, different contacts of the user are represented as virtual audience members. For example, at a first difficulty level, contacts of the user identified as friends and/or family are represented as virtual audience members and, at a second difficulty level, contacts of the user identified as co-workers or professional contacts are represented as virtual audience members.

In various implementations, a behavior of a particular virtual audience member of the one or more virtual audience members is based on the difficulty level. For example, in FIG. 5B, based on the second difficulty level, the virtual student 511C stands up from the virtual chair 521 behind the virtual desk 522 and begins to exit the classroom. As another example, in FIG. 6B, based on the third difficulty level, the virtual audience member 611E has left the virtual chair 631 and moved toward the virtual refreshment table 621. As another example, in FIG. 6F, based on the third difficulty level, the virtual audience member 611A has stood up to ask a question of the user.

In various implementations, based on the difficulty level, the virtual audience members exhibit various behaviors to distract the user during the rehearsal of the presentation. In various implementations, at a low difficulty level, a virtual audience member is displayed as engaged with (e.g., paying attention to) the presentation. However, at a higher difficulty level, the virtual audience member is displayed as bored, uninterested, or distracted. The virtual audience member may be displayed in such states via their facial expression. Thus, in various implementations, a facial expression of a particular virtual audience member of the one or more virtual audience members is based on the difficulty level.

In various implementations, a virtual audience member is displayed as moving within the XR environment, e.g., to leave the XR environment, get refreshments, change seats, or ask a question of the user. In various implementations, the virtual audience members ask questions of the user based on the difficulty level. For example, at a low difficulty level, a virtual audience member may ask a straightforward question based on the slides, audio of the user during the rehearsal, or previously recorded audio of the user during a previous rehearsal. At a higher difficulty level, the virtual audience member may ask a more difficult, less relevant, or more non-sequitur question. In various implementations, at a low difficulty level, a virtual audience member asks a question of the user at the end of the presentations. At a higher difficulty level, the virtual audience member interrupts the presentation to ask the question.

In various implementations, displaying the one or more virtual objects based on the difficulty level includes displaying one or more virtual distractors based on the difficulty level. For example, in FIG. 6D, the electronic device displays virtual balls 642 falling from the ceiling. In various implementations, the visual distractors may include virtual lights or virtual confetti. In various implementations, at a first difficulty level, visual distractors are not displayed and, at a second difficulty level higher than the first difficulty level, visual distractors are displayed.

In various implementations, displaying the one or more virtual objects based on the difficulty level includes displaying one or more virtual objects based on the one or more slides of the presentation. For example, as noted above, in various implementations, a virtual audience member asks a question based on the content of the slides of the presentation. In various implementations, during a performance of a presentation, audience feedback is displayed by the electronic device, such as an eye tracking indicator indicating a portion of the slide at which audience members are gazing based on audience eye tracking data received by the electronic device, an engagement bar indicating a level at which audience members are engaged with the presentation, or search notifications indicating web search queries performed by audience members during the presentation. In various implementations, based on the slides of the presentation and the difficulty level, the electronic device displays fake audience feedback. For example, at a first difficulty level, the electronic device displays an eye tracking indicator indicating a portion of the slide that the user is discussing and, at a second difficulty level higher than the first difficulty level, the electronic displays an eye tracking indicator over an irrelevant portion of the slide. As another example, at a first difficulty level, the electronic device displays an engagement bar indicating that the audience is engaged and, at a second difficulty level higher than the first difficulty level, the electronic device displays an engagement bar indicating that the audience is bored or confused.

Figure 8:
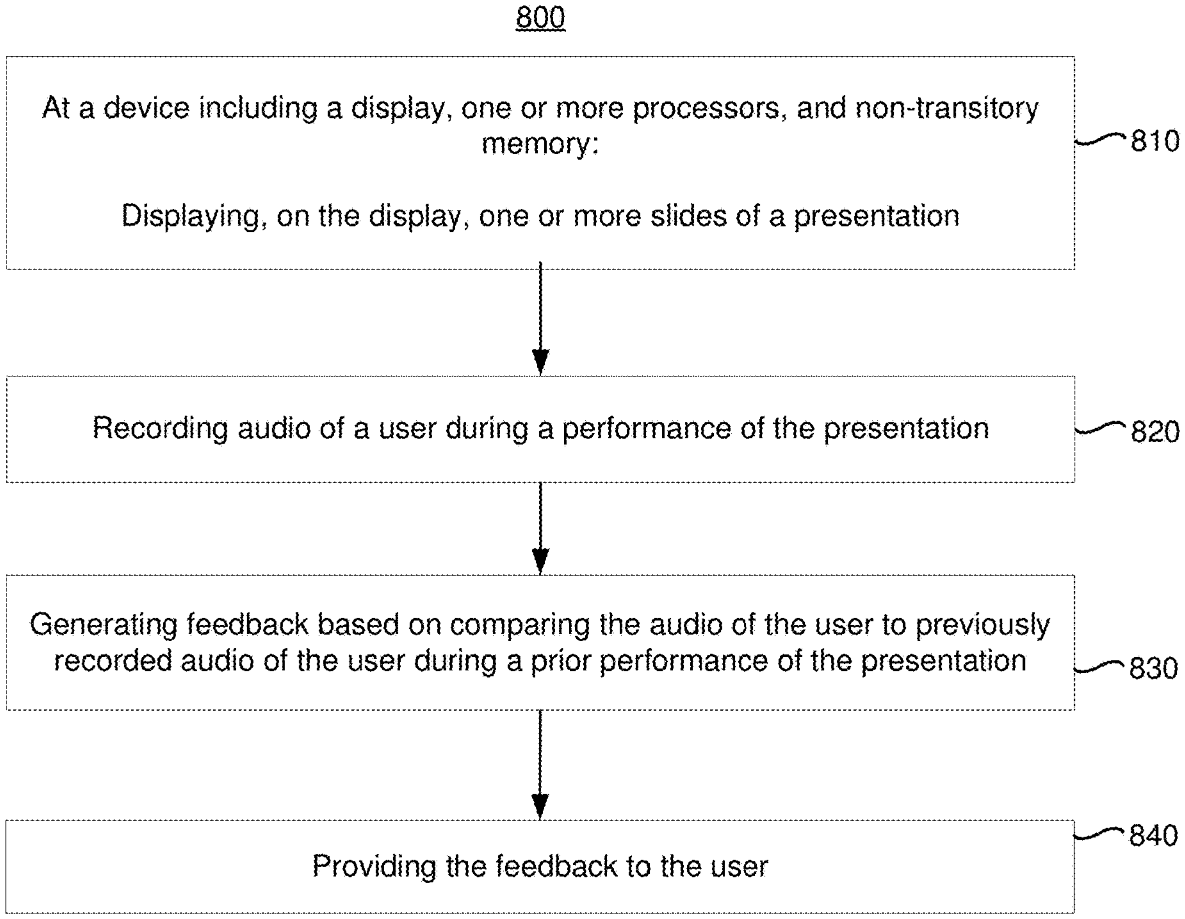
FIG. 8 is a flowchart representation of a method of providing feedback on a performance of a presentation in accordance with some implementations.

FIG. 8 is a flowchart representation of a method 800 of providing feedback on a performance of a presentation in accordance with some implementations. In various implementations, the method 800 is performed by a device including a display, one or more processors, and non-transitory memory (e.g., the electronic device 120 of FIG. 3). In some implementations, the method 800 is performed by processing logic, including hardware, firmware, software, or a combination thereof. In some implementations, the method 800 is performed by a processor executing instructions (e.g., code) stored in a non-transitory computer-readable medium (e.g., a memory).

In various implementations, a performance of a presentation is a rehearsal of a presentation (e.g., to virtual audience members). In various implementations, a performance of a presentation is a live performance of a presentation (e.g., to physical audience members).

The method 800 begins, in block 810, with the device displaying, on the display, one or more slides of a presentation. For example, in FIGS. 4A-4C, the electronic device displays the slide window 412 which displays, at various times, the first, second, and third slides of the presentation. In various implementations, the device displays on the one or more slides of the presentation in a slide window. In various implementations, the size and/or the location of the slide window is manipulable by a user of the device. For example, in various implementations, the user provides user input to move the slide window to a different location on the display. As another example, in various implementations, the user provides user input to change a size of the slide window. In various implementations, the slide window is at least partially transparent.

The method 800 continues, in block 820, with the device recording audio of a user during a performance of the presentation. In various implementations, the audio of the user includes speech of the user. In various implementations, the device performs speech recognition on the audio of the user to generate text of the performance of the presentation. In various implementations, portions of text of the performance of the presentation are time-stamped. In various implementations, the device records slide transition times of the performance of the presentation.

In various implementations, the device stores previously recorded audio of the user during prior performance of the presentation. In various implementations, the previously recorded audio of the user includes speech of the user. In various implementations, the device performs speech recognition on the previously recorded audio of the user to generate text of the prior performance of the presentation. In various implementations, portions of the text of the prior performance of the presentation are time-stamped. In various implementations, the device stores slide transition times of the prior performance of the presentation.

The method 800 continues, in block 830, with the device generating feedback based on comparing the audio of the user to the previously recorded audio of the user during a prior performance of the presentation. In various implementations, the audio of the user is compared to multiple sets of previously recorded audio during prior performances of the presentations. In various implementations, the audio of the user is compared to the previously recorded audio of the user during one or more prior performances that have a subjective and/or objective rating greater than a threshold. Thus, the current performance is compared to a well-rated prior performance or desired performance.

In various implementations, generating the feedback includes comparing content of the audio of the user (e.g., speech of the user, possibility as text of the performance of the presentation) to content of the previously recorded audio of the user (e.g., speech of the user, possibility as text of the prior performance of the presentation). For example, in various implementations, the feedback indicates that the user has failed to discuss a topic, make a point, or say a particular keyword in the performance of the presentation that the user did discuss, make, or say in the prior performance. For example, in FIG. 5B, the first feedback notification 525A indicates that the user failed to make "POINT 1B" from the slides.

In various implementations, generating the feedback includes comparing a time of the audio of the user to a corresponding time of the previously recorded audio of the user. For example, in various implementations, an amount of time spent discussing a particular topic or presenting a particular slide is compared to the corresponding amount of time spent in a prior performance of the presentation. For example, in FIG. 6E, the second feedback notification 625B indicates that the user has spent too much time on the current slide (e.g., more than a prior performance).

In various implementations, generating the feedback includes comparing an intelligibility of speech of the audio of the user to an intelligibility of speech of the previously recorded audio of the user. Various measures of intelligibility can be used including speech recognition metrics. For example, in FIG. 5C, the second feedback notification 525B indicates that the user is speaking too fast (e.g., faster than a prior performance).

In various implementations, generating the feedback is further based on comparing slide transition times during the performance of the presentation to previously recorded slide transition times during the prior performance of the presentation. For example, such comparison can be used to determine the amount of time spent presenting each slide. As another example, such comparison can be used to determine what speech corresponds which each slide so as to determine whether a user missed a slide transition. For example, in FIG. 6C, the first feedback notification 625A indicates that the user has possibly missed a slide transition (e.g., because the user has spent more time on the first slide than in a prior performance or because the user is discussing content that was discussed in a prior performance while the second slide was displayed).

In various implementations, generating the feedback is further based on comparing the audio of the user to the one or more slides of the presentation. In various implementations, the feedback is based on comparing the audio of the user to content of the one or more slides of the presentation. For example, by comparing the text of the presentation to text of the slides, the electronic device can determine that certain topics were not discussed. For example, in FIG. 5B, the first feedback notification 525A indicates that the user failed to make "POINT 1B" from the slides.

In various implementations, generating the feedback is further based on a biometric of the user during the performance of the presentation. Such biometrics include heart rate, skin temperature and/or resistance, or pupil dilation. For example, the electronic device can determine whether the user is calm or nervous and provide corresponding feedback. For example, in FIG. 4D, the feedback window 415 indicates that the user "seemed nervous."

In various implementations, generating the feedback is based on movement of the user during the performance of the presentation. For example, in various implementations, feedback is based on minimal or excessive hand movement, minimal or excessing head movement (indicating the gaze of the user, e.g., where the user is looking and/or making eye contact), or posture.

As noted above, in various implementations, the electronic device displays one or more virtual distractors. In various implementations, generating the feedback is based on the presence of virtual distractors. For example, in FIG. 6G, the feedback window 615 indicates that the user "handled distractions well." For example, in various implementations, when the pace of slide transitions, amount of movement of the user, or audio of the user (e.g., pace, tone, clarity) is steady in the presence of virtual distractors as compared to the absence of virtual distractors, feedback is generated that the user successfully handled the distractions.

In various implementations, the device determines a time-varying stress level based on the biometrics. In various implementations, the stress level is determined using a machine learning algorithm. For example, in various implementations, the biometrics are fed into a neural network to generate the stress level at various times during performance of the presentation. Thus, in various implementations, the feedback includes a stress level of the user.

The method 800 continues, in block 840, with the device providing the feedback to the user. In various implementations, providing the feedback is performed during the performance of the presentation. In various implementations, providing the feedback to the user includes displaying, on the display, a feedback notification. For example, in FIG. 5B, the electronic device displays the first feedback notification 525A during the second rehearsal of the presentation. In various implementations, providing the feedback to the user includes altering display of the one or more slides of the presentation. As another example, in FIG. 5C, the electronic device displays the second feedback notification 525B and dims the slide window 512 during the second rehearsal of the presentation.

In various implementations, providing the feedback to the user is performed after performance of the presentation. For example, in FIG. 5D, the electronic device displays the feedback window 515 including feedback on the performance of the presentation.

As noted above, in various implementations, the device stores previously recorded audio of the user during prior performance of the presentation. In various implementations, the device stores additional data regarding the prior performance of the presentation, such as slide transition times, eye tracking gaze information of the user, or body tracking information of the user.

In various implementations, based on the data regarding the prior performance of the presentation, the device generates an XR environment representation of the prior performance of the presentation. For example, in various implementations, the device displays an XR environment while playing the previously recorded audio of the user during prior performance of the presentation. In various implementations, the XR environment includes a screen displaying a current slide of the presentation based on previously recorded slide transition times. In various implementations, the XR environment includes a representation of the user based on previously recorded eye tracking gaze information of the user or body tracking information of the user. Thus, in various implementations, the user (or another user) can view a representation of the prior performance of the presentation from any location in the XR environment.

For example, in various implementations, the third XR environment 600 of FIGS. 6A-6G includes a virtual screen and a user at the location of the virtual chair 631 (or any other location in the third XR environment 600) can experience a representation of the prior performance of the presentation by looking at the virtual screen, either with a representation of the presenter or without a representation of the presenter.

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

It will also be understood that, although the terms "first," "second," etc. may be used herein to describe various elements, these elements should not be limited by these terms. These terms are only used to distinguish one element from another. For example, a first node could be termed a second node, and, similarly, a second node could be termed a first node, which changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular implementations only and is not intended to be limiting of the claims. As used in the description of the implementations and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

What is claimed is:

1. A method comprising:

at a device including a display, one or more processors, and non-transitory memory:

displaying, on the display, one or more slides of a presentation;

recording audio of a user during a performance of the presentation;

generating feedback based on the audio of the user; and providing the feedback to the user, wherein providing the feedback includes displaying an XR environment representation of the performance of the presentation including an XR representation of the user based on the audio of the user and additional data of the user during the performance of the presentation.

2. The method of claim 1, wherein generating the feedback is based on the content of the audio of the user.

3. The method of claim 1, wherein generating the feedback is based on a time of the audio of the user.

4. The method of claim 1, wherein generating the feedback is based on an intelligibility of speech of the audio of the user.

5. The method of claim 1, wherein generating the feedback is based on slide transition times during the performance of the presentation.

6. The method of claim 1, wherein the XR representation of the user is based on a biometric of the user during the performance of the presentation.

7. The method of claim 6, wherein the biometric includes body movement of the user during the performance of the presentation.

8. The method of claim 6, wherein the biometric includes eye gaze during the performance of the presentation.

9. The method of claim 1, wherein displaying the XR environment representation includes displaying, on the display, an XR screen displaying the one or more slides of the presentation.

10. The method of claim 9, wherein providing the feedback to the user includes altering display of the one or more slides of the presentation on the XR screen.

11. A device comprising:

a display;

a non-transitory memory; and one or more processors to:

display, on the display, one or more slides of a presentation;

record audio of a user during a performance of the presentation;

generate feedback based on the audio of the user; and provide the feedback to the user, wherein providing the feedback includes displaying an XR environment representation of the performance of the presentation including an XR representation of the user based on the audio of the user and additional data of the user during the performance of the presentation.

12. The device of claim 11, wherein the one or more processors are to generate the feedback based on content of the audio of the user.

13. The device of claim 11, wherein the one or more processors are to generate the feedback based on a time of the audio of the user.

14. The device of claim 11, wherein the one or more processors are to display the XR representation by displaying, on the display, an XR screen displaying the one or more slides of the presentation.

15. The device of claim 11, wherein the one or more processors are to provide the feedback to the user by altering display of the one or more slides of the presentation on the XR screen.

16. The device of claim 11, wherein the XR representation of the user is based on a biometric of the user during the performance of the presentation.

17. The device of claim 16, wherein the biometric includes body movement of the user during the performance of the presentation.

18. The device of claim 16, wherein the biometric includes eye gaze during the performance of the presentation.

19. A non-transitory memory storing one or more programs, which, when executed by one or more processors of a device including a display, cause the device to:

display, on the display, one or more slides of a presentation;

record audio of a user during a performance of the presentation;

generate feedback based on the audio of the user; and provide the feedback to the user, wherein providing the feedback includes displaying an XR environment representation of the performance of the presentation including an XR representation of the user based on the audio of the user and additional data of the user during the performance of the presentation.

* * * * *